(12) United States Patent
Culp et al.

(10) Patent No.: US 11,960,314 B1
(45) Date of Patent: Apr. 16, 2024

(54) COLLECTIVE CONTROL SYSTEM FOR A ROTORCRAFT

(71) Applicant: Essex Industries, Inc., St. Louis, MO (US)

(72) Inventors: Charles Culp, Webster Groves, MO (US); Greg Kemner, Cottleville, MO (US); Bob Hale, Cincinnati, OH (US)

(73) Assignee: Essex Industries, Inc., St. Louis, MO (US)

( * ) Notice: Subject to any disclaimer, the term of this patent is extended or adjusted under 35 U.S.C. 154(b) by 61 days.

(21) Appl. No.: 17/144,423

(22) Filed: Jan. 8, 2021

Related U.S. Application Data

(63) Continuation of application No. 16/712,668, filed on Dec. 12, 2019, now Pat. No. 10,890,936, which is a
(Continued)

(51) Int. Cl.
    *G05G 1/06* (2006.01)
    *B64C 27/56* (2006.01)
    (Continued)

(52) U.S. Cl.
    CPC ............ *G05G 1/06* (2013.01); *B64C 27/56* (2013.01); *G05G 1/02* (2013.01); *G05G 1/04* (2013.01); *G05G 13/00* (2013.01)

(58) Field of Classification Search
    CPC .. G05G 1/02; G05G 1/04; G05G 1/06; G05G 13/00; B64C 27/54; B64C 27/56; B64C 13/04
    See application file for complete search history.

(56) References Cited

U.S. PATENT DOCUMENTS

| | | |
|---|---|---|
| 4,012,014 A | 3/1977 | Marshall |
| 4,696,445 A | 9/1987 | Wright et al. |

(Continued)

FOREIGN PATENT DOCUMENTS

| | | |
|---|---|---|
| DE | 102005017013 A1 | 10/2006 |
| EP | 29655937 B1 | 6/2017 |

(Continued)

OTHER PUBLICATIONS

Operators Manual, Army Model, UH-1HN/V Helicopters, TM 55—1520-210-10, Headquarters, Depattment of the Army, Feb. 15, 1988 (29 Pages).

(Continued)

*Primary Examiner* — Prasad V Gokhale
(74) *Attorney, Agent, or Firm* — Lewis Rice LLC

(57) ABSTRACT

The control system for attachment to a collective lever in a rotorcraft which comprises a body with an extended horn portion which is generally contoured to provide for a place to rest the palm and grip the collective lever at the end in the form of an open spherical grip as opposed to the more traditional cylindrical grip used to grasp the throttle and/or collective lever directly. The control system generally includes a plurality of controls which can be manipulated by any or all of the four fingers of the hand and the thumb without need to substantially move the palm. The collective lever can also be moved without having to remove the hand from the control system or the fingers or thumb from the controls.

14 Claims, 36 Drawing Sheets

Related U.S. Application Data continuation of application No. 16/203,989, filed on Nov. 29, 2018, now Pat. No. 10,591,948.

(60) Provisional application No. 62/725,019, filed on Aug. 30, 2018.

(51) Int. Cl.
  *G05G 1/02* (2006.01)
  *G05G 1/04* (2006.01)
  *G05G 13/00* (2006.01)

(56) References Cited

U.S. PATENT DOCUMENTS

| | | | |
|---|---|---|---|
| 4,738,417 A | | 4/1988 | Wenger |
| 4,811,921 A | | 3/1989 | Whitaker et al. |
| D309,051 S | * | 7/1990 | Laatsch .................. D34/27 |
| 5,076,517 A | | 12/1991 | Ferranti et al. |
| 5,156,363 A | | 10/1992 | Cizewski et al. |
| D341,129 S | | 11/1993 | McCormick |
| 5,472,156 A | | 12/1995 | Bivens, III et al. |
| 6,148,593 A | * | 11/2000 | Heinsey .................. G05G 1/01 701/50 |
| D560,591 S | | 1/2008 | Hutchinson |
| D581,328 S | | 11/2008 | Kluck |
| D613,232 S | | 4/2010 | Guering |
| D647,014 S | | 10/2011 | Kluck |
| D675,555 S | | 2/2013 | Ouellette |
| D701,161 S | | 3/2014 | Yates et al. |
| D701,485 S | | 3/2014 | Yates et al. |
| D701,486 S | | 3/2014 | Yates et al. |
| D723,033 S | | 2/2015 | Hoock |
| D738,354 S | | 9/2015 | Morrison |
| 9,315,103 B2 | * | 4/2016 | Yamauchi ............... G05G 1/62 |
| D759,569 S | | 6/2016 | Kasparian et al. |
| D760,145 S | | 6/2016 | Kasparian et al. |
| D769,178 S | | 10/2016 | Kasparian et al. |
| D775,562 S | | 1/2017 | Ingenlath et al. |
| D776,656 S | | 1/2017 | Agerstedt et al. |
| D819,745 S | | 6/2018 | Goslin et al. |
| 10,011,348 B1 | | 7/2018 | Wong et al. |
| 10,035,583 B2 | | 7/2018 | Scofield et al. |
| D835,199 S | | 12/2018 | Inuyama |
| D837,111 S | | 1/2019 | Holton et al. |
| D870,616 S | | 12/2019 | Aruga |
| 2005/0279561 A1 | | 12/2005 | Shearer et al. |
| 2008/0128253 A1 | | 6/2008 | Mack |
| 2009/0200116 A1 | | 8/2009 | Wiggins et al. |
| 2011/0048162 A1 | * | 3/2011 | Miura .................. G05G 1/06 74/523 |
| 2011/0148667 A1 | | 6/2011 | Yeh |
| 2014/0021303 A1 | | 1/2014 | Salamat et al. |
| 2014/0091181 A1 | | 4/2014 | Ouellette |
| 2014/0116183 A1 | | 5/2014 | Smith et al. |
| 2016/0009174 A1 | | 1/2016 | Yamauchi et al. |
| 2017/0113783 A1 | * | 4/2017 | Scofield ............. B64C 13/0421 |
| 2019/0025869 A1 | * | 1/2019 | Parazynski ............. G05G 1/02 |
| 2020/0012309 A1 | * | 1/2020 | Wuisan ................ G05G 9/047 |

FOREIGN PATENT DOCUMENTS

| | | |
|---|---|---|
| GB | 2491855 A | 12/2012 |
| JP | H0195500 U | 6/1989 |

OTHER PUBLICATIONS

Helicopter Flying Handbook, U.S. Department of Transportation, Federal Aviation Administration, Flight Standards Service, FAA-H-8083-21A, 2012 (10 Pages).
International Search Report, International Patent Application No. PCT/US2019/035227, dated Sep. 18, 2019 (11 pages).
European Search Report and Written Opinion for Application No. 19853308.5 dated May 19, 2022, 4 Pages.
Indian Search Report and Written Opinion for Application No. 202117007073, dated Aug. 25, 2022, 6 Pages.

* cited by examiner

COLLECTIVE CONTROL SYSTEM FOR A ROTORCRAFT

CROSS REFERENCE TO RELATED APPLICATION(S)

This Application is a Continuation of U.S. Utility patent application Ser. No. 16/712,668, filed Dec. 12, 2019, which is a Continuation of U.S. Utility patent application Ser. No. 16/203,989, filed Nov. 29, 2018, which claims the benefit of U.S. Provisional Patent Application Ser. No. 62/725,019, filed Aug. 30, 2018. The entire disclosure of both documents is incorporated herein by reference.

BACKGROUND OF THE INVENTION

1. Field of the Invention

This disclosure is related to the field of control devices, and more specifically to a control system which can be placed on the end of the collective pitch control of a rotorcraft.

2. Description of Related Art

The flight control system of most aircraft is quite a bit different from that of a ground based vehicle. The reason is immediately apparent, an aircraft operates in a three dimensional space, while a ground based vehicle such as a car, truck, or boat typically only operates in a two dimensional space as it needs to remain in contact with the ground. Another issue is that the movement of an aircraft often requires multiple interactions at once because a change to one action causes a need to counteract part of the motion with another.

One of the places where this is bluntly shown is in piloting a rotorcraft. A rotorcraft is effectively a flying wing with a cabin along for the ride. In effect, a rotorcraft pilot is adjusting how the wing is moving through the air through the various controls in order to direct the wing, and thus the rotorcraft, where s/he wants it to go. This motion is as opposed to a fixed wing aircraft where the wing is "fixed" to the cabin and control is more directed to how the air is moving over the wing. Basically, in a rotorcraft, the primary engine moves the wing while in a fixed wing aircraft the primary engine moves the air.

It has been said that one of the most difficult abilities to learn is how to hover a rotorcraft. The reason is because hovering (holding still in the air) requires essentially a constant selection of small adjustments to counter the effect of other small adjustments. This is also true in an automobile or boat to a lesser extent, but it is dramatically exaggerated in a rotorcraft.

Rotorcraft essentially have three controls, the cyclic stick, the collective lever, and the anti-torque pedals. What the controls do is relatively straightforward even if putting them into practice is very complicated. The collective lever is effectively a large lever which can be pulled up and down and which controls the pitch of the rotor blades "collectively." As the rotors are effectively one big wing moving through the air, this effectively controls the vertical movement of the rotorcraft. Increasing the pitch causes the rotors to push more air and move the rotorcraft upward while decreasing it causes them to cut through the air as opposed to direct it downward. As the rotorcraft has a mass from it's engine and other components, the force of the air being pushed downward needs to be greater than the mass of the rotorcraft to move it upward. If it is less, the mass of the rotorcraft under gravity will pull the rotorcraft toward the earth.

The speed at which the rotors are turning also effects this as faster turning blades will also cause the blades to move more air (at all pitches) than slower turning blades. However, changes to the pitch and the throttle have to be tied together. As the pitch increases, the blades face more drag and will slow down unless the throttle is increased. While many modern rotorcraft compensate for this automatically, it was originally done manually and the throttle control is typically located on the collective lever for this reason. The throttle is typically a rotating handgrip which increases or decreases the engine speed. In this way a pilot can utilize the collective lever and throttle together.

The cyclic basically serves to tilt the rotor "wing" in the direction one wants the rotorcraft to move. In reality, it does not really tilt the entire system, it instead tilts the individual rotors "cyclically" so that they are at a different pitch at different parts of the rotation, but each rotor at the same location is at the same pitch. This change serves to cause the wing to move away from the position of higher pitch and toward the position of lower pitch.

The anti-torque pedals operate to keep the body of the rotorcraft from rotating in the direction opposite the rotation of the rotors. They control the pitch of the rotors on the tail (in a traditional helicopter with a single main blade) to increase or decrease the force applied to the helicopter. This is used to counteract the force of rotation imparted on the rotorcraft from the rotating main rotors, but increasing or decreasing it can cause the rotorcraft to rotate in place in either direction.

When flying a rotorcraft, the pilot will typically have one hand on the collective lever and one on the cyclic. In this way, the pilot can be making slight (and often near constant) adjustments to both parts of the rotor motion. This allows the rotorcraft to fly straight and smooth. The anti-torque pedals, as their name implies, are typically operated with the feet.

In addition to flying the rotorcraft, the pilot also needs to have access to auxiliary controls on the rotorcraft. This can include everything from lighting controls, to controls over payloads, to controls for displays, to the operation of weapon systems on military rotorcraft. Many of these controls are located on the panels in front of the pilot or above their head where they are readily accessible. However, because the pilot typically has one hand on each of the collective lever and cyclic, and the feet on the anti-torque pedals while airborne, a pilot typically has to take a hand off one of these control elements to operate any controls which are on a panel in front or overhead. Thus, these places are often the site of controls used when the rotorcraft is on the ground and there is no need for the pilot to be holding onto the collective lever and cyclic.

Auxiliary controls which are needed in flight are often located on boxes or "control systems" which are attached to the cyclic or collective levers, usually at the top near or at where the hands are positioned to allow for the buttons to be operated without needing to remove the hand from the respective control. In this way, the buttons can be readily adjusted or operated by the user while maintaining full flight controls. Buttons and controls on the cyclic are often positioned on the control system facing upward from the top of the handgrip where they can be operated by the thumb, or to one side or the front of the handgrip (a so called "pistol grip") where they can be manipulated by the fingers without removing the hand from the grip.

The control system on the collective lever, because the hand is positioned similarly around the collective lever to grasp the throttle, are typically positioned as part of a flat panel at the end of the collective lever facing upward toward the user. These can be operated by the thumb without the need to move the hand or fully release the grip on the throttle and collective lever. FIG. 1 shows an example of the collective lever (1) and associated control system (3) and controls (4) thereon from a UH-1H/V Army rotorcraft illustrating how the controls (4) may be typically arranged. The grip (5) is the throttle.

The problem with the arrangement of controls (4) on the control system (3) of FIG. 1 is that it is very dependent on actions being performed by the thumb and the thumb is generally the only digit with ready access to the controls (4) without the hand being removed from the throttle (5) and, thus, the collective lever (1). Originally (or in what are commonly called "true" rotorcraft), this was a necessary component of the design as movement of the collective lever (1) and adjustment of the throttle grip (5) would need to occur simultaneously in essentially all cases.

In more modern rotorcraft, however, it is common fora throttle control or governor to be installed on the motor which provides for an automatic feedback loop between the collective lever (1) position and the motor itself. Specifically, an adjustment of the collective lever (1) often no longer requires a corresponding manual adjustment to the throttle grip (5) as this change is performed automatically by a governor on the motor based on a feedback loop. This allows for a pilot to adjust the collective lever (1) without the need to adjust the throttle (5). However, the hand has still not been freed up from its positioning on the collective lever (1) and controls on the collective lever (1) have still generally operated by the thumb to maintain the positioning of the hand on the collective lever (1).

SUMMARY OF THE INVENTION

Because of these and other problems in the art, described herein, among other things, is a control system which is designed to be attached to a collective lever (1) in a rotorcraft which sits at or toward the end of the collective lever and serves as a grip as well as a support for controls. The control system comprises a body with an extended horn portion which is generally contoured to provide for a place to rest the palm and grip the collective lever at the end in the form of an open spherical grip as opposed to the more traditional cylindrical grip used to grasp the throttle (5) and/or collective lever (1). The control system generally includes a plurality of controls, such as buttons, switches, touch sensors, and the like which can be manipulated by any or all of the four fingers of the hand and the thumb without need to substantially move the palm. The collective lever (1) can also be moved without having to remove the hand from the control system or the fingers from the controls.

There is described herein, among other things, a control system for attachment to the collective lever of a rotorcraft, the control system comprising: a generally planar lower surface for attachment to an end of a collective lever; a main body having a generally convex form; a horn portion extending from a side of said main body; and a plurality of controls, wherein at least one control in said plurality is arranged on said main body and at least one control in said plurality is arranged on said horn portion; wherein, said control system is configured to be grasped in an open spherical grip by a human hand with the fingers of said human hand on said main body and the thumb of said human hand on said horn portion; and wherein said control system is configured for said human hand grasping said control system to move said collective lever without removing said fingers of said human hand from said main body and said thumb of said human hand from said horn portion.

There is also described herein, a collective lever and control system of a rotorcraft comprising: a collective lever having two opposing ends; a control system attached to one of said two opposing ends of said collective lever, said control system comprising: a main body having a generally convex form; a horn portion extending from a side of said main body; and a plurality of controls, wherein at least one control in said plurality is arranged on said main body and at least one control in said plurality is arranged on said horn portion; wherein, said control system is configured to be grasped in an open spherical grip by a human hand with the fingers of said human hand on said main body and the thumb of said human hand on said horn portion; and wherein said human hand grasping said control system moves said collective lever without removing said fingers of said human hand from said main body and said thumb of said human hand from said horn portion.

In an embodiment of the control system, the main body is generally squircle in cross section.

In an embodiment of the control system, the main body is generally rectilinear in cross section.

In an embodiment of the control system, the horn portion is generally mushroom-shaped including an extension portion and a distinct support portion.

In an embodiment of the control system, the horn portion is an extension of said main body.

In an embodiment of the control system, the horn portion overhangs said main body on at least one side.

In an embodiment of the control system, when the human hand grasps said control system at least one of said fingers of said human hand is positioned on said control on said main body and said thumb of said human hand is positioned on said control on said horn portion.

In an embodiment of the control system, the thumb of said human hand may be moved from said horn portion to operate an additional control on said main body.

There is also described herein a method of operating a collective lever and control system of a rotorcraft comprising: providing a collective lever having two opposing ends; providing a control system attached to one of said two opposing ends of said collective lever, said control system comprising: a main body having a generally convex form; a horn portion extending from a side of said main body; and a plurality of controls, wherein at least one control in said plurality is arranged on said main body and at least one control in said plurality is arranged on said horn portion; grasping said control system so that fingers are on said main body and a thumb on said horn portion; pulling said collective lever without removing said fingers from said main body; moving said thumb from said horn portion to said main body; and operating said plurality of controls with at least one of said fingers and said thumb without removing said fingers from said main body.

BRIEF DESCRIPTION OF THE DRAWINGS

In FIG. 9, the thumb is positioned on a first control on the horn portion of the body.

In FIG. 10, the thumb is positioned on a second control on the horn portion of the body.

In FIG. 11, the thumb is positioned on a first control on the main portion of the body.

In FIG. 12, the thumb is positioned on a second control on the main portion of the body.

In FIG. 13, the fingers are positioned on a first selection of controls which are on both the main portion and horn portion of the body.

In FIG. 14, the fingers are positioned on a second selection of controls which are on only the main portion of the body.

DESCRIPTION OF THE PREFERRED EMBODIMENT(S)

The following detailed description and disclosure illustrates by way of example and not by way of limitation. This description will enable one skilled in the art to make and use the disclosed structures and methods, and describes several embodiments, adaptations, variations, alternatives and uses of the disclosed structures and methods. As various changes could be made in the above constructions without departing from the scope of the disclosures, it is intended that all matter contained in the description or shown in the accompanying drawings shall be interpreted as illustrative and not in a limiting sense.

The control systems discussed herein provide for generally new structures, systems, and methods for both providing controls on a collective lever (1) of a rotorcraft as well as a new methodology and structure for manipulating the collective pitch of the rotors. Traditionally, as discussed above, the collective lever (1) has comprised a simple generally cylindrical shaft with a twist handle (5) (for controlling the throttle) arranged around a portion of a first end. A pilot has traditionally grasped the twist handle (5) in what is often referred to as a cylindrical grip or power grip. This is placing the palm against the exterior of the twist handle (5) and wrapping the fingers around the handle (5) a first direction and the thumb around the handle (5) in the other. The thumb will generally touch the index finger and/or middle finger so that the shaft of the collective lever runs across the hand and through the circle formed by the thumb and index/middle finger.

The power or cylindrical grip is a very common grip used by humans in tool manipulation and is appropriate for operation of the collective lever (1) as it allows a user to have a very rigid and solid grasp of the twist handle (5) and, thus, the collective lever (1). It also allows the user to pull on the collective lever (1) utilizing their arm muscles (as opposed to those of their fingers). The fingers, instead, are simply used to connect the arm muscle to the collective lever (1), the wrapping position of the fingers supporting the collective lever (1) through the use of their internal bone structure with the strength of the fingers being used simply to keep their relative position.

Figure 1:
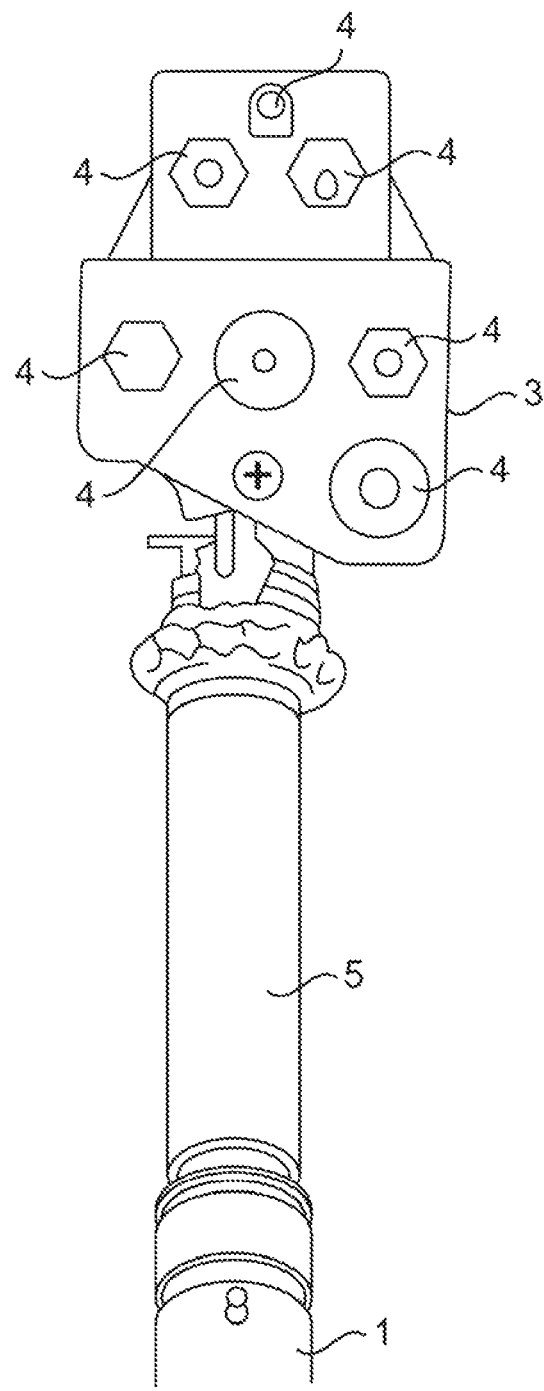
FIG. 1 provides a view of a collective control system positioned on a collective lever of the prior art, specifically the collective control system and collective lever from a US Army model UH-1H/V helicopter.

Because of the position of the collective lever (1) at the (generally left) side of the pilot, the left hand is typically used to grasp the collective lever (1) with the hand held generally downward. Thus, the fingers are used to push against the lever arm when the collective lever (1) is pulled upward, while the thumb is used to push against the collective lever (1) as it is pushed downward. This also means the thumb is, in the view of the pilot, on "top" of the collective lever (1). Buttons on the control system (3) located at the terminal end of the collective lever (1) are also generally positioned on a box or similar structure extending from the end of the collective lever (1) and the controls are also generally arranged on the top of the control system (3) to be readily accessible by the thumb as shown in, for example, FIG. 1.

It should first be recognized that the types of controls that are to be included on a collective control system or positioned on the collective lever (1) in any way can be highly varied and with a large variety of different function depending on the model of rotorcraft and the purpose to which that rotorcraft is being used. For example, military combat rotorcraft will generally have different controls on the collective control system than heavy lift rotorcraft or recreational sport rotorcraft. However, even within these differences some controls may remain the same. For example, many control systems include a toggle or similar control for a landing light located on the collective control system.

Further, the types of controls a pilot will be provided to manipulate will often depend on the type and use of the rotorcraft as well as the current cockpit technology in use. For example, an older or more simple rotorcraft may need more controls in the form of toggle switches, push buttons, or mechanical slides with distinct internal positions and corresponding function. Other rotorcraft may require more modern controls such as multi-position toggles, wheels or rotating spheres (e.g. a "mouse wheel"), or floating multi-positon plates (such as that used on an original Ipod™, for example). Still more modern rotorcraft controls can utilize touch pads, motion or thermal sensors, or light-based switches for example.

The present disclosure is not directed to the types of controls presented on the control system. It is instead directed to the structure of the control system and the positioning of such controls on its structure. For this reason, this disclosure will commonly refer to the items manipulated by the user on the control system simply as "controls" or "buttons" even though a "button" as indicated herein may actually refer to a sophisticated touchscreen with a large number of potential input positions. This use of this simplified terminology is done solely for clarity of explanation of the concepts of the control system and should in no way be taken as limiting of this disclosure. Thus, the fact that certain types of controls are depicted in certain positions in FIGS. 2-36 should, in no way, be taken to limit the types of controls which may be located at any particular position.

FIGS. 2-8 show a first embodiment of a control system (101) in accordance with the present disclosure while FIGS. 15-21 show a second embodiment of a control system (1101), FIGS. 22-29 a third embodiment of a control system (2101), and FIGS. 30-36 a fourth embodiment of a control system (4101). As should be apparent, the control system (101) of FIGS. 2-8 is designed to attach at the end of the collective lever (1) generally in front of the throttle grip (5), should a throttle grip (5) even be present. The depicted control systems (101), (1101), (2101), or (3101) are generally attached in the loose form of a ball terminator on a shaft. That is, the main body (103) of the control system (101) will generally extend outward from the shaft of the collective lever (1) in all directions as shown in FIGS. 2-8. Thus, the control system (101) forms a bulbous end on the collective lever (1). This is also the case with control system (1101), control system (2101), and control system (3101) which attach in similar fashion to control system (101) to the collective lever (1).

Figure 5:
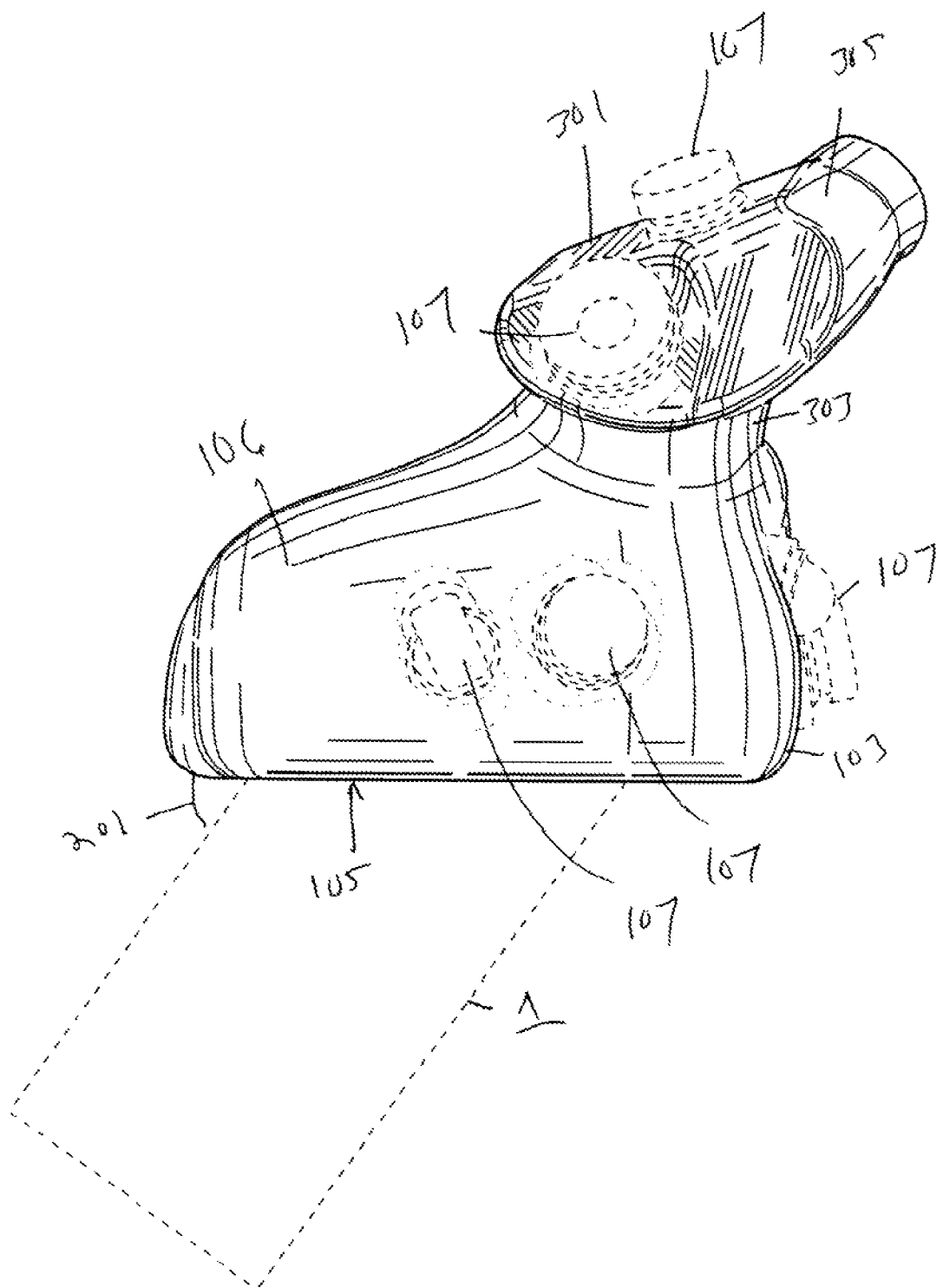
FIG. 5 provides a right side view of the embodiment of FIG. 2.
Figure 6:
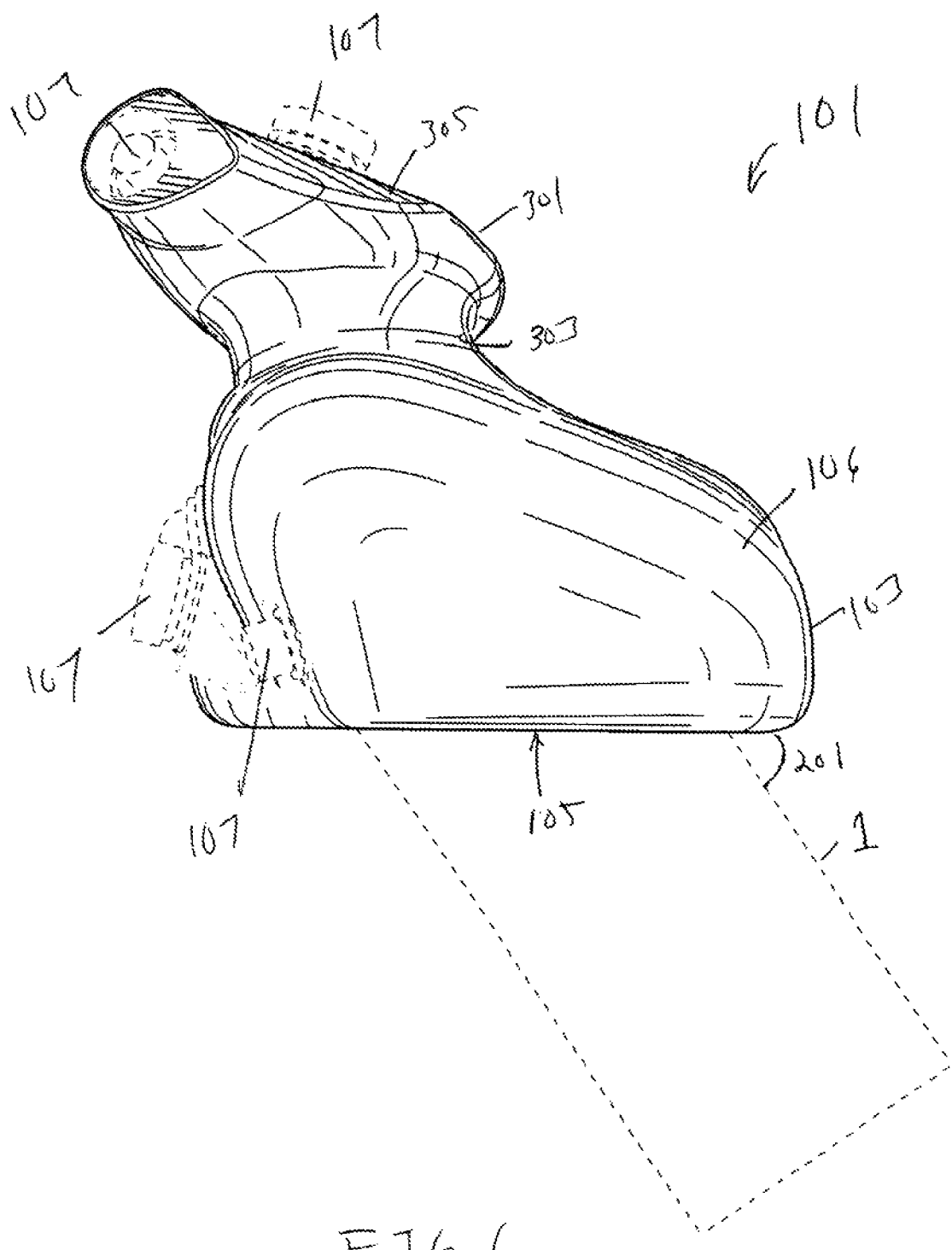
FIG. 6 provides a left side view of the embodiment of FIG. 2.

As can be seen in FIGS. 2-8, the main body (103) of the control system (101) will typically have a generally planar lower surface (105) to which the end of the collective lever (1) is attached. This will typically be through the use of a mounting plate (151) and screws (153) although any method of generally rigid attachment may be used. The planar lower surface (105) is typically arranged at an acute angle (201) (at the top) of generally about 45 degrees to the main axis of the collective lever (1) as best shown in FIGS. 5 and 6. The angle (201), however, need not be an acute angle at all and the planar lower surface (105) may be arranged at any angle between 0 and 180 degrees. In an embodiment, the generally planar lower surface (105) is arranged at generally a 90 degree angle which would render the generally planar lower surface (105) generally perpendicular to the axis of the collective lever (1). Again, the other control system embodiments (1101), (2101), and (3101) also will generally attach in a similar fashion via their associated generally planar lower surface (1105), (2105), and (3105) respectively.

The control systems (101), (1101). (2101), and (3101) generally comprise a main body (103), (1103), (2103), and (3103) which are of a generally three-dimensional bulbous form. As discussed above, with generally planar lower surfaces (105), (1105), (2105), and (3105), the upper surfaces (106), (1106). (2106), and (3106) will usually have a generally convex shape extending away from the planar lower surface (105), 1105), (2105), or (2105) respectively. In effect, the closest traditional mathematical structure to the control system could be considered a hemisphere, but, as can be seen in the FIGS., in none of the four embodiments is the upper surface (106), (1106), (2106), or (3106) a typical smooth curve, but they all generally include multiple interacting arcs and curves to provide a bulbous shape.

The convex upper surfaces (106), (1106), (2106), and (3106) of the main bodies (103), (1103), (2103), and (3103) are generally not a smooth arc across their entire surface, but comprise a series of multiple interacting arcs of a variety of contours and shapes. The specific contours and shapes differ across the different depicted embodiments and the depicted embodiments do not provide for all possible contours and shapes, but they are considered exemplary. As should be apparent from the FIGS., the non-planar upper surfaces (106), (1106), (2106), and (3106) of the control systems (101), (1101), (2101), and (3101) are typically an arcuate or generally non-regularly undulating convex shape. As part of the undulation, it is, therefore, possible, that a portion of the upper surface (106), (1106), (2106), or (3106) would actually be concave. For example, the embodiment of FIGS. 22-29 has such a section (2501). However, as should be clear, the resultant structure of the upper surface (2106) is still generally convex.

Figure 7:
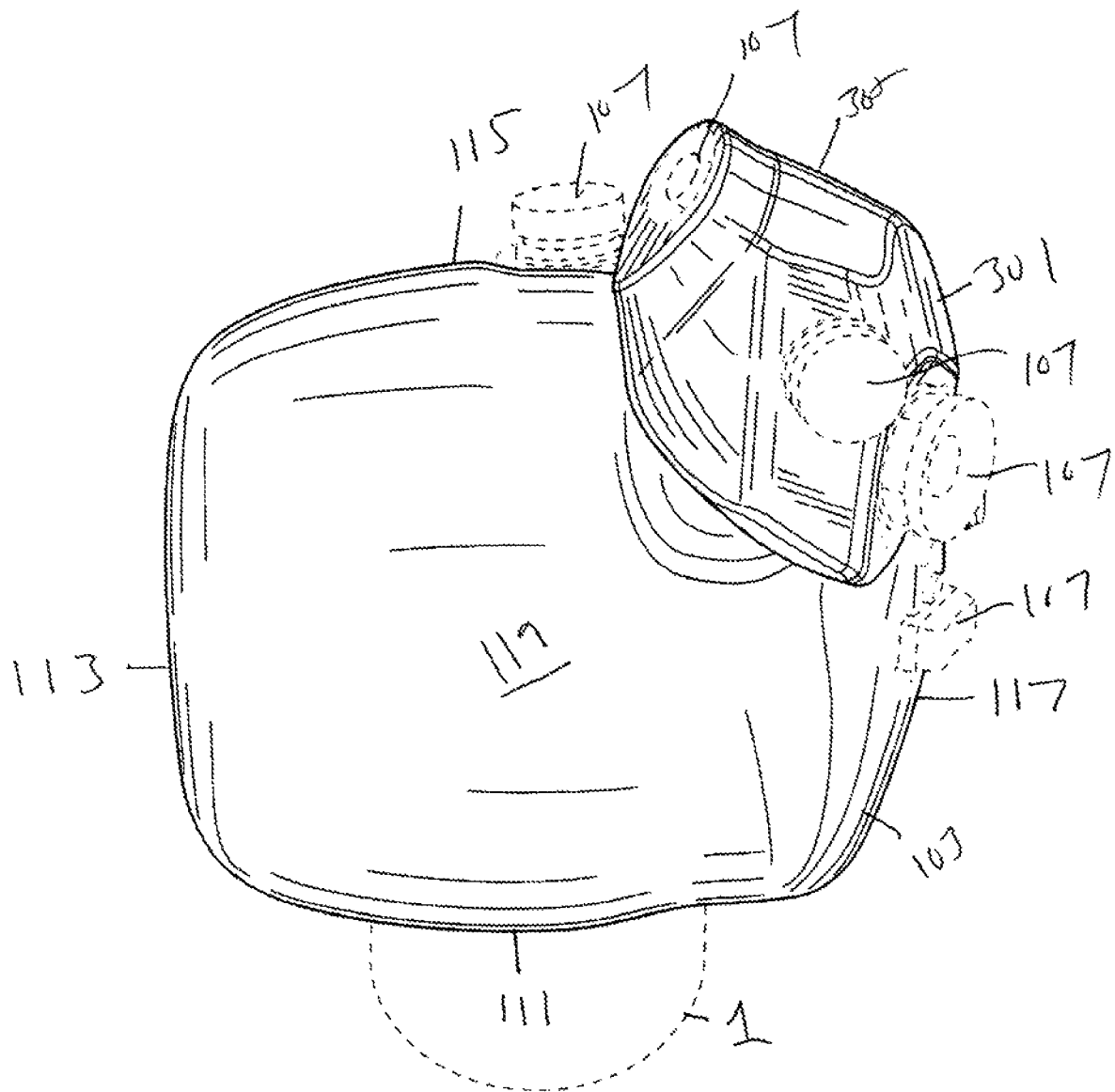
FIG. 7 provides a top view of the embodiment of FIG. 2.

Further, as should also be clear, the upper surface (106), (1106), (2106), and (3106) typically also are considered herein to include the "sides" of the main body (103), (1103), (2103), and (3103). In the first embodiment this would be the general areas (111), (113), (115), and (117) as best seen in FIG. 7 as the sides (111), (113), (115), and (117) freely flow into the top (119) in that embodiment. It should be apparent that the other embodiments also will generally include sides as part of the upper surface (1106). (2106), and (3106) in similar fashion. As can be best seen in FIG. 20, the sides (1111), (1113), (1115), and (1117) freely flow into the top (1119) in the second embodiment. As can be best seen in FIG. 28, the sides (2111), (2113), (2115), and (2117) freely flow into the top (2119) in the third embodiment. Finally, as can be best seen in FIG. 35 the sides (3111), (3113), (3115), and (3117) freely flow into the top (3119) in the fourth embodiment.

Part of the reason for the variation in the upper surfaces (106), (1106), (2106), and (3106) both between and within embodiments is that while the convex second surface can have a variety of specific shapes, the shapes are generally designed to at least partially conform to the position of a human hand in a generally open spherical grip. A spherical grip is the grip used to grasp a ball, as opposed to a cylinder, and instead of the joints of the fingers generally being aligned with each other and adjacent as in a cylindrical grip, the fingers are commonly spread out and while the specific bend of each finger may be similar or not, the major joints are generally not aligned but are positioned on a simple or even complex curve. A spherical grip is often more akin to presenting the hand as a talon or claw type arrangement as opposed to a cylindrical grip where the hand essentially forms a tube. The thumb is also not positioned to form a circle with the index/middle finger but is extended more to the side of the palm.

In the present device, the spherical grip used is typically a more open spherical grip. That is, the fingers will typically be spread and not along a smooth curve. As is common in a spherical grip, the thumb is also not placed under the palm and touching one of the other fingers, but is designed to be positioned more to the side of the hand. The control systems (101), (1101), (2101), and (3101) upper surfaces (106), (1106), (2106), and (3106) are therefore designed to present convex upper surfaces (106), (1106), (2106), and (3106) which are about as large as a standard human hand or slightly larger so the fingers generally cannot wrap around the convex upper surface (106), (1106), (2106), and (3106) to contact the planar lower surface (105), (1105), (2105), or (3105) respectively. It should be recognized, however, that simple variation in hand size between pilots will mean that any pilot interacting with the control system (101), (1101), (2101), or (3101) will likely have a slightly different resulting hand grip position than any other.

Figure 8:
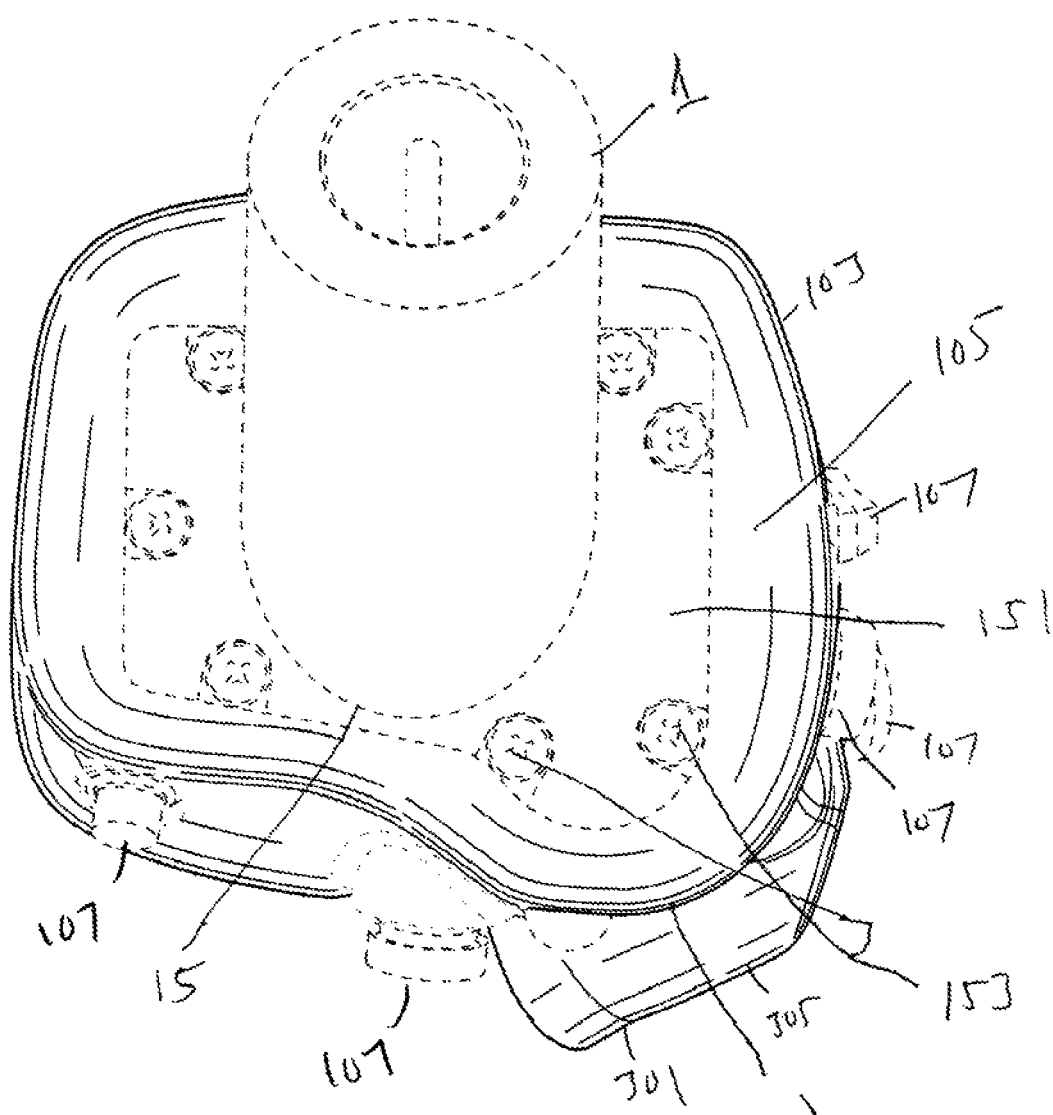
FIG. 8 provides a bottom view of the embodiment of FIG. 2.
Figure 9:
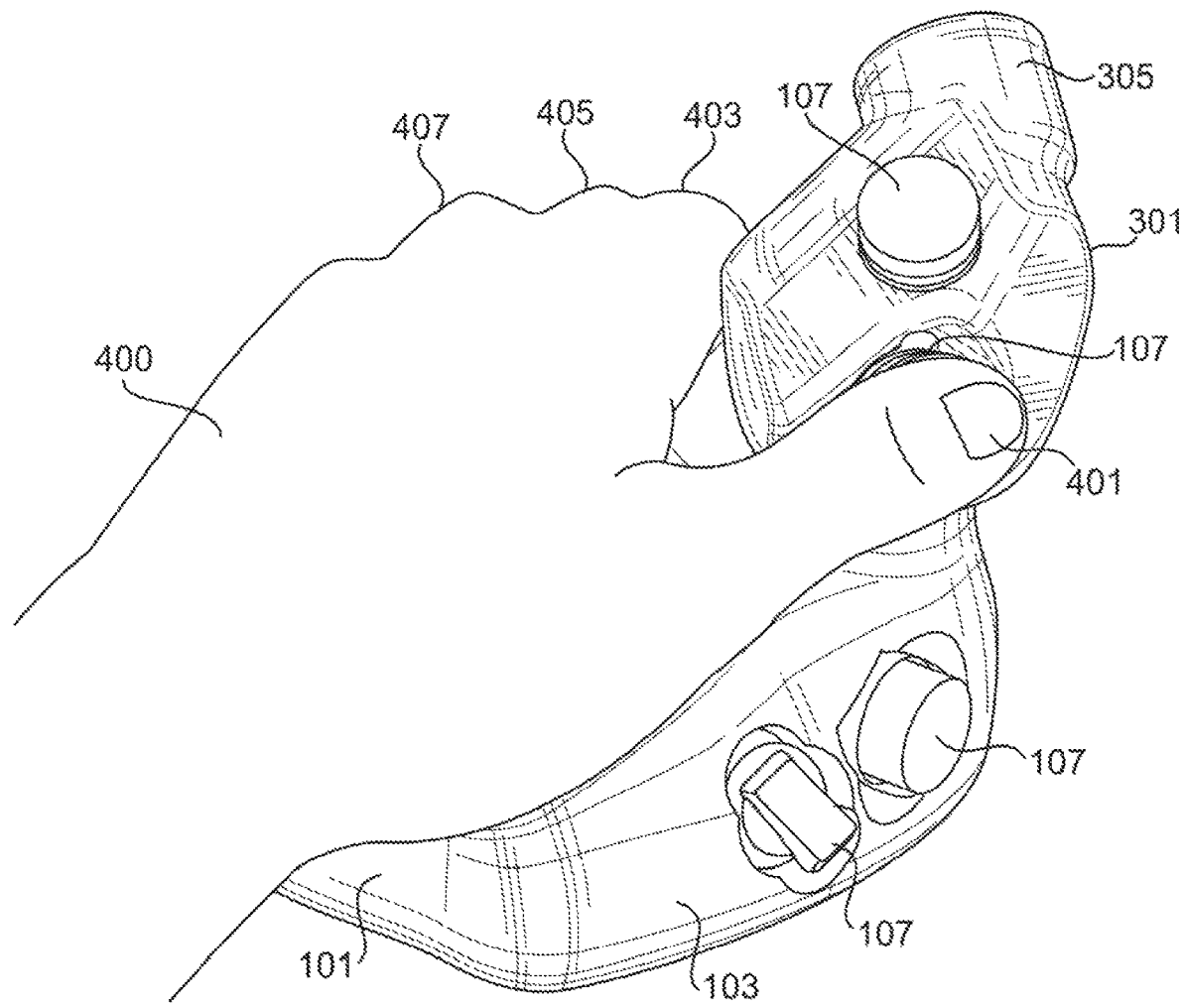
FIG. 9 provides a first right side view of the embodiment FIG. 2 with a human hand gripping the collective control system in an open spherical grip.
Figure 10:
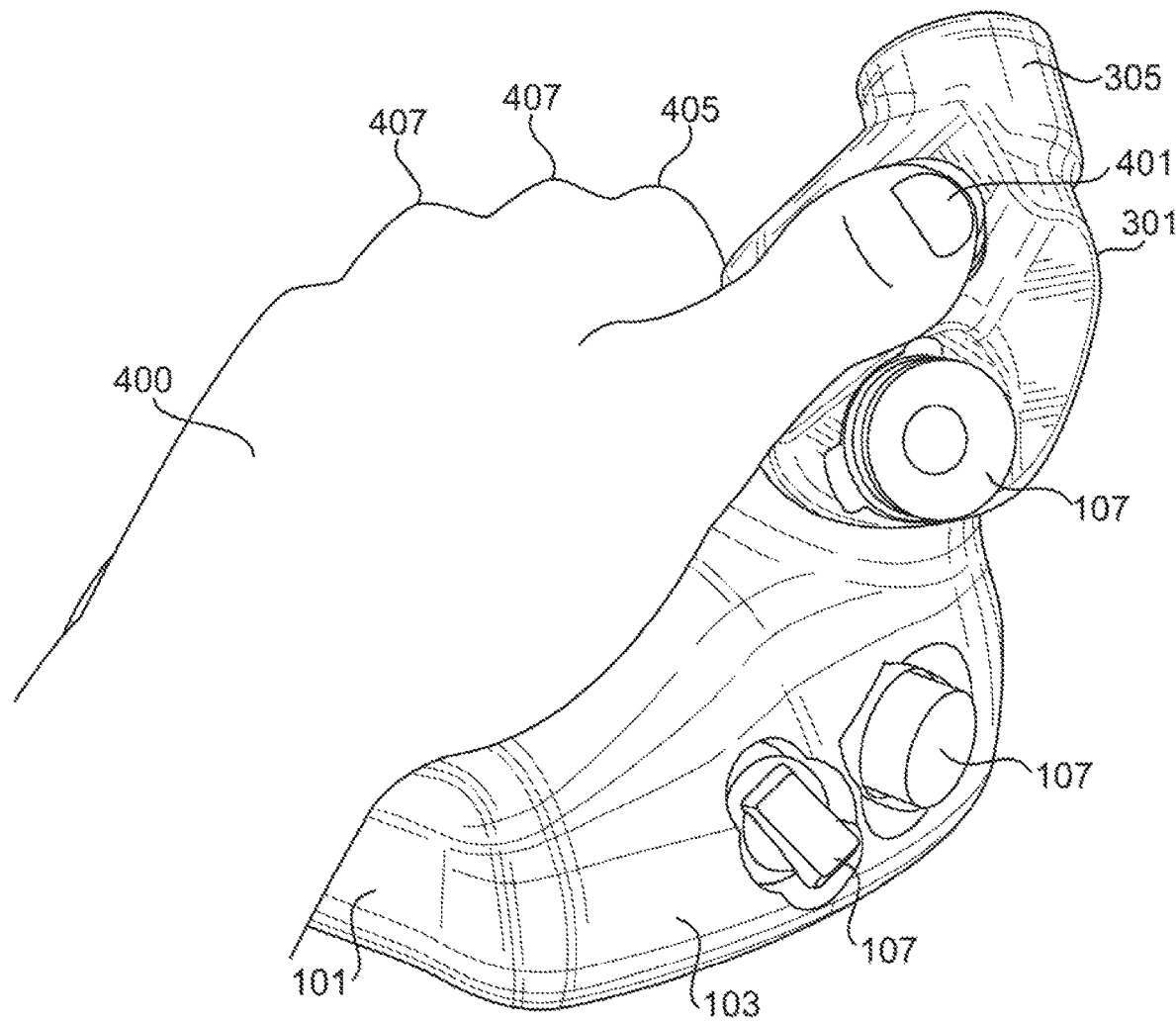
FIG. 10 provides a second right side view of the embodiment FIG. 9.
Figure 11:
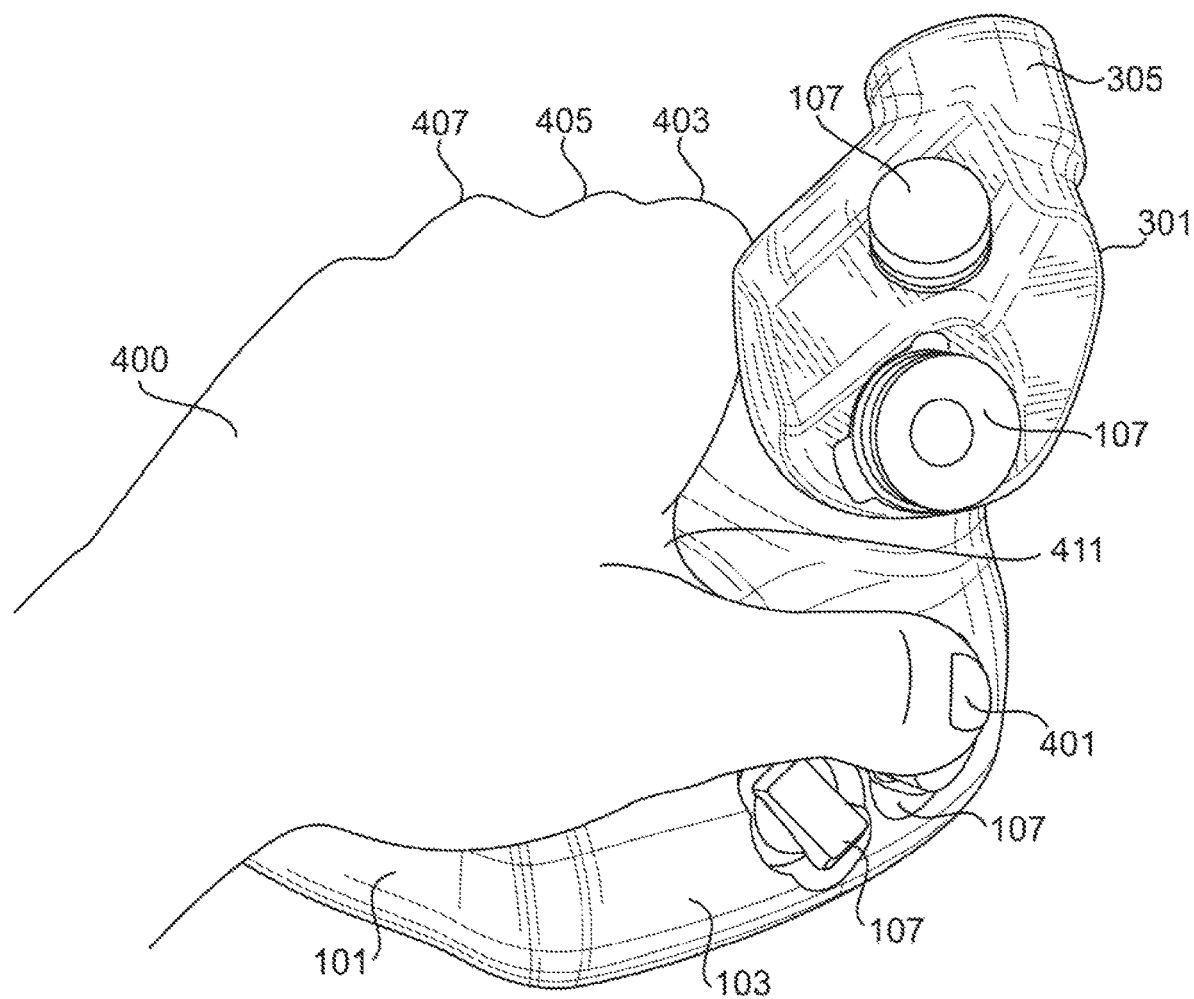
FIG. 11 provides a third right side view of the embodiment FIG. 9.
Figure 12:
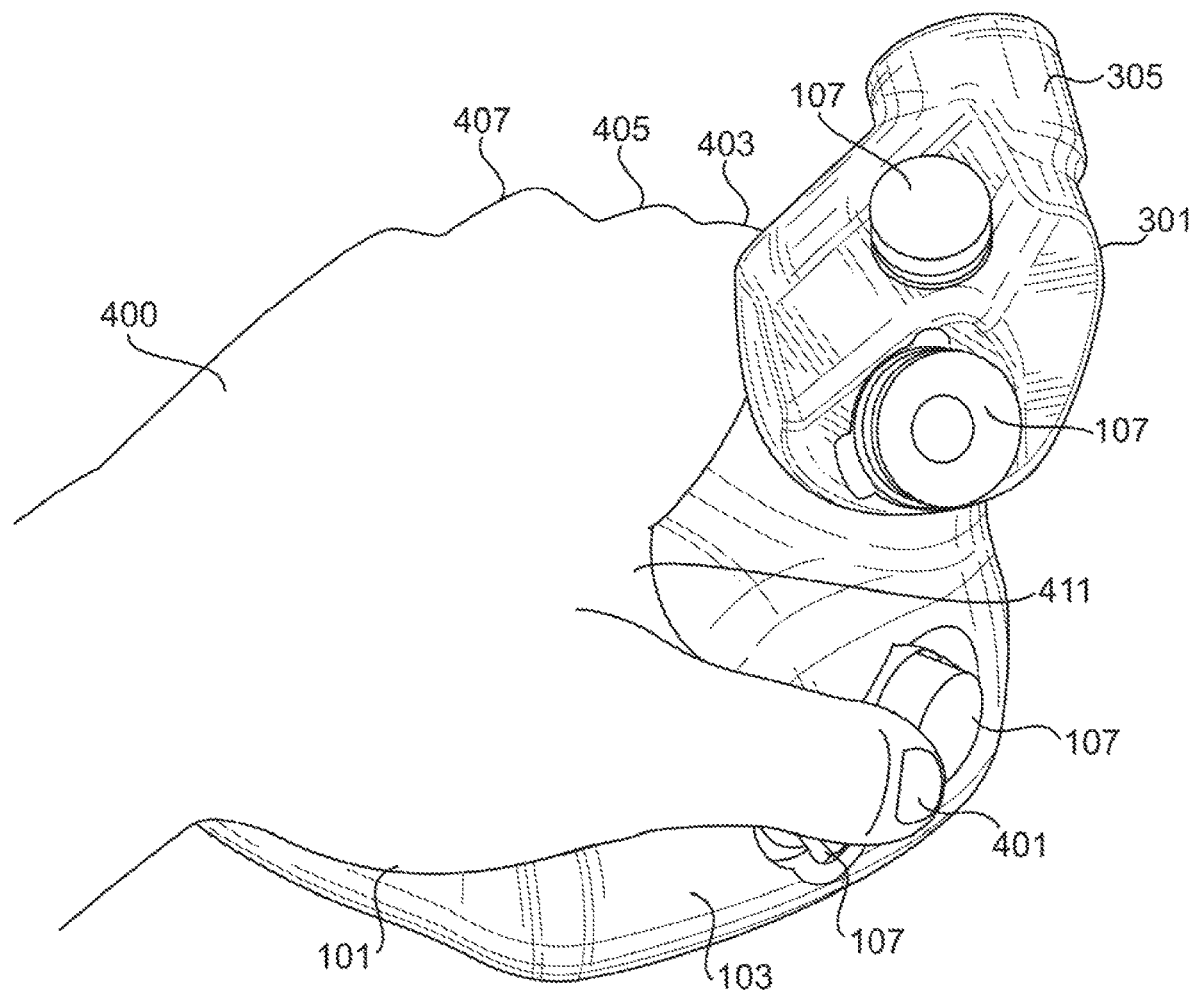
FIG. 12 provides a fourth right side view of the embodiment FIG. 9.
Figure 13:
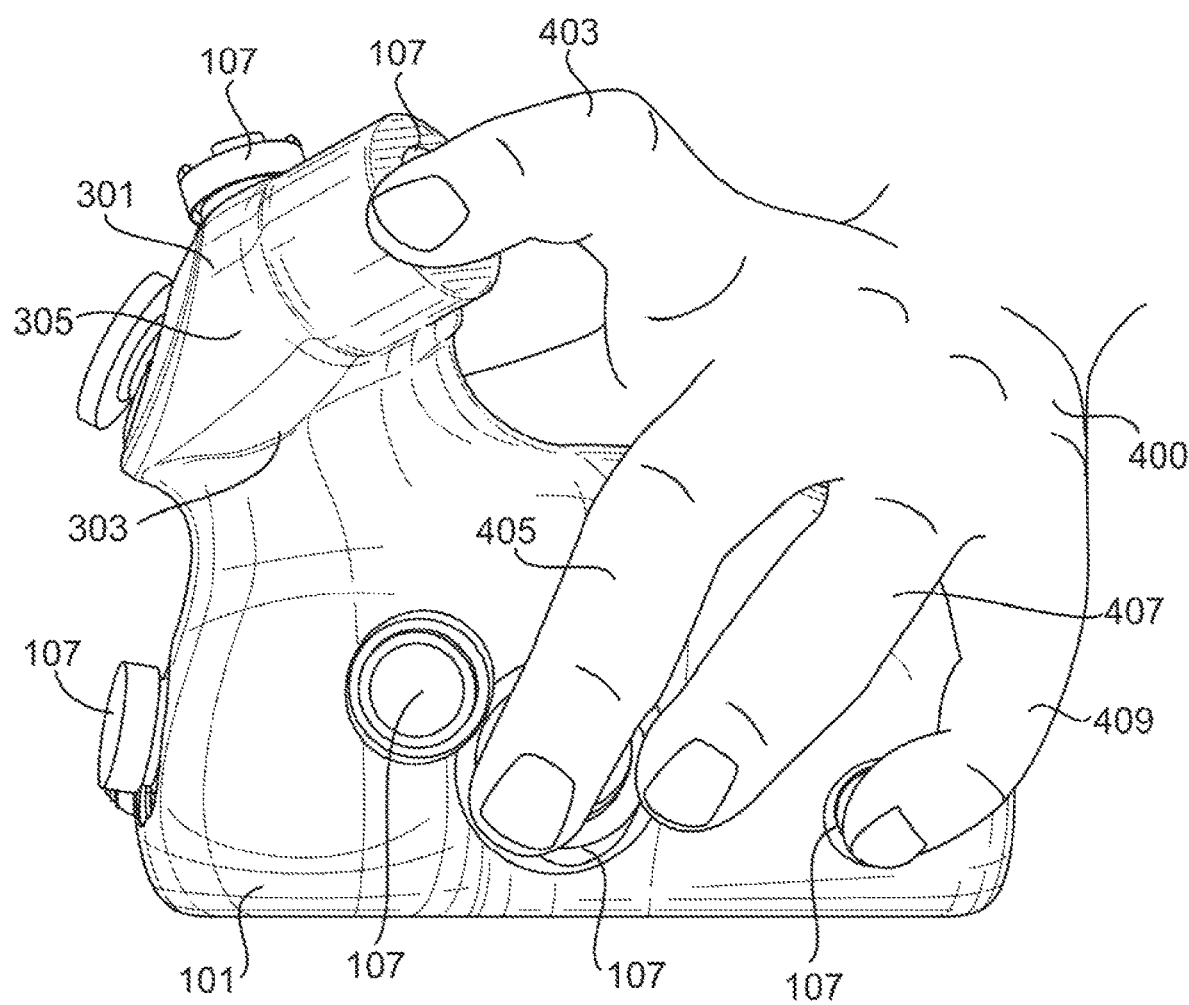
FIG. 13 provides a first front view of the embodiment FIG. 9.
Figure 14:
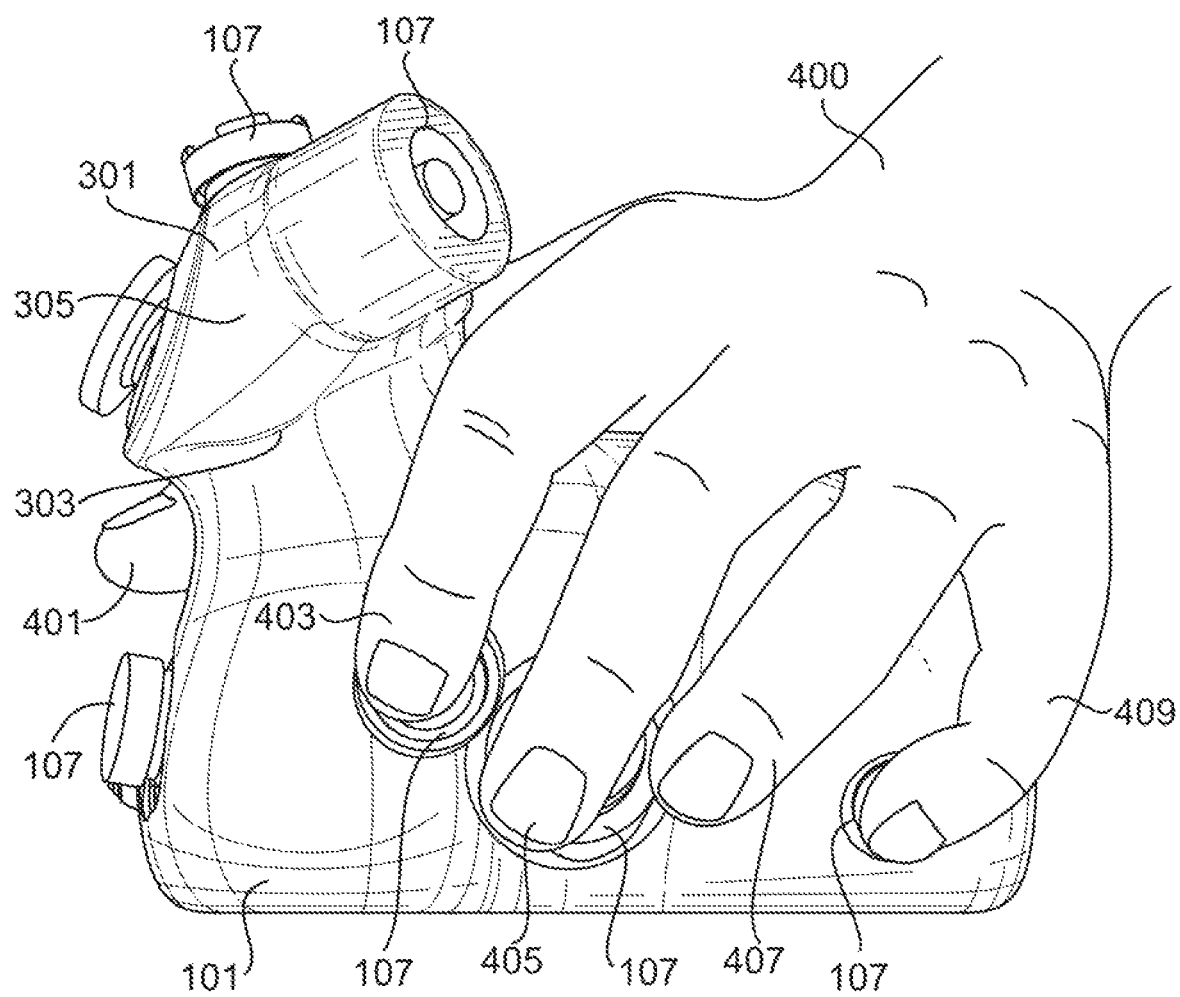
FIG. 14 provides a second front view of the embodiment FIG. 9.
Figure 15:
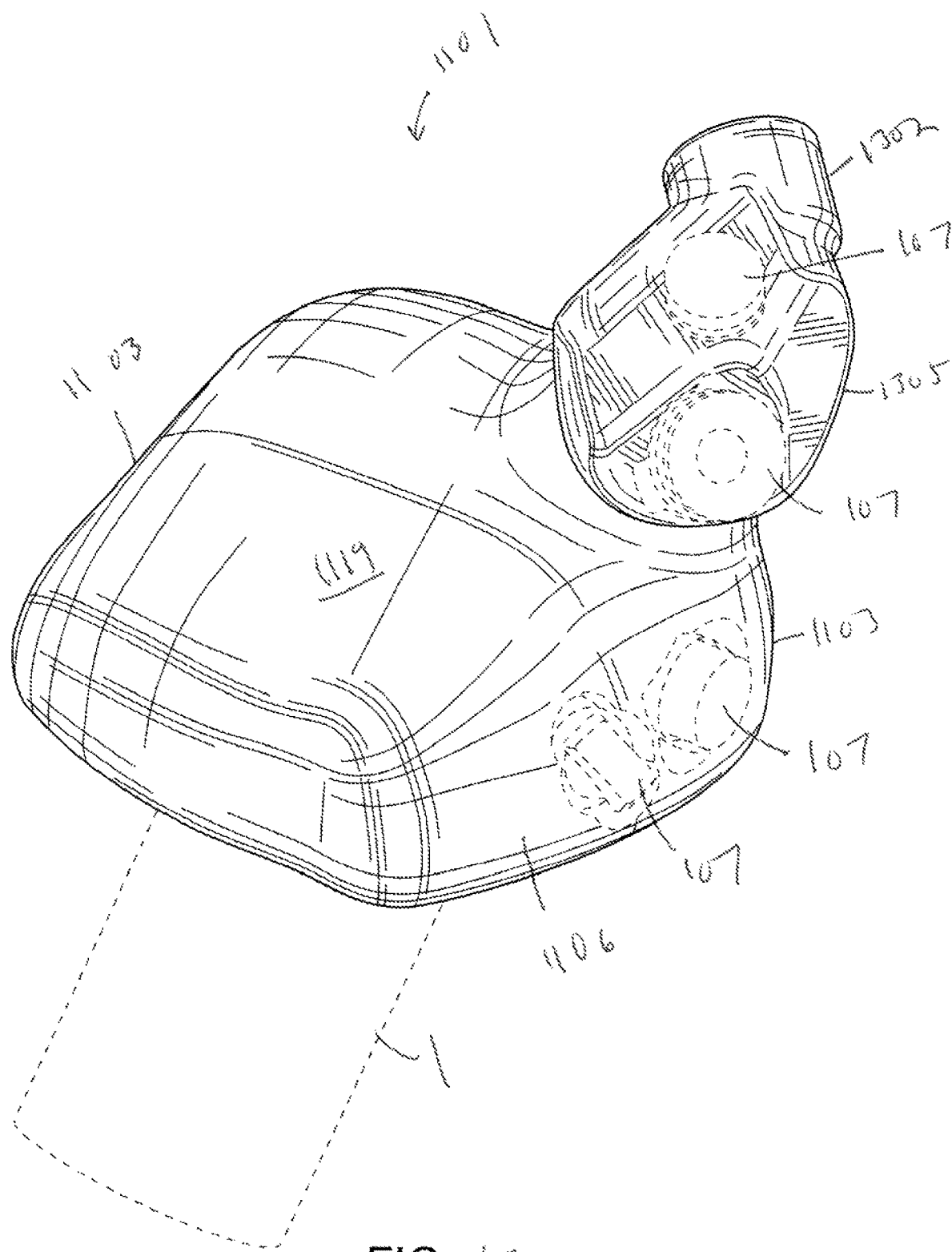
FIG. 15 provides a back and right perspective view of a second embodiment of a control system of the present invention.
Figure 16:
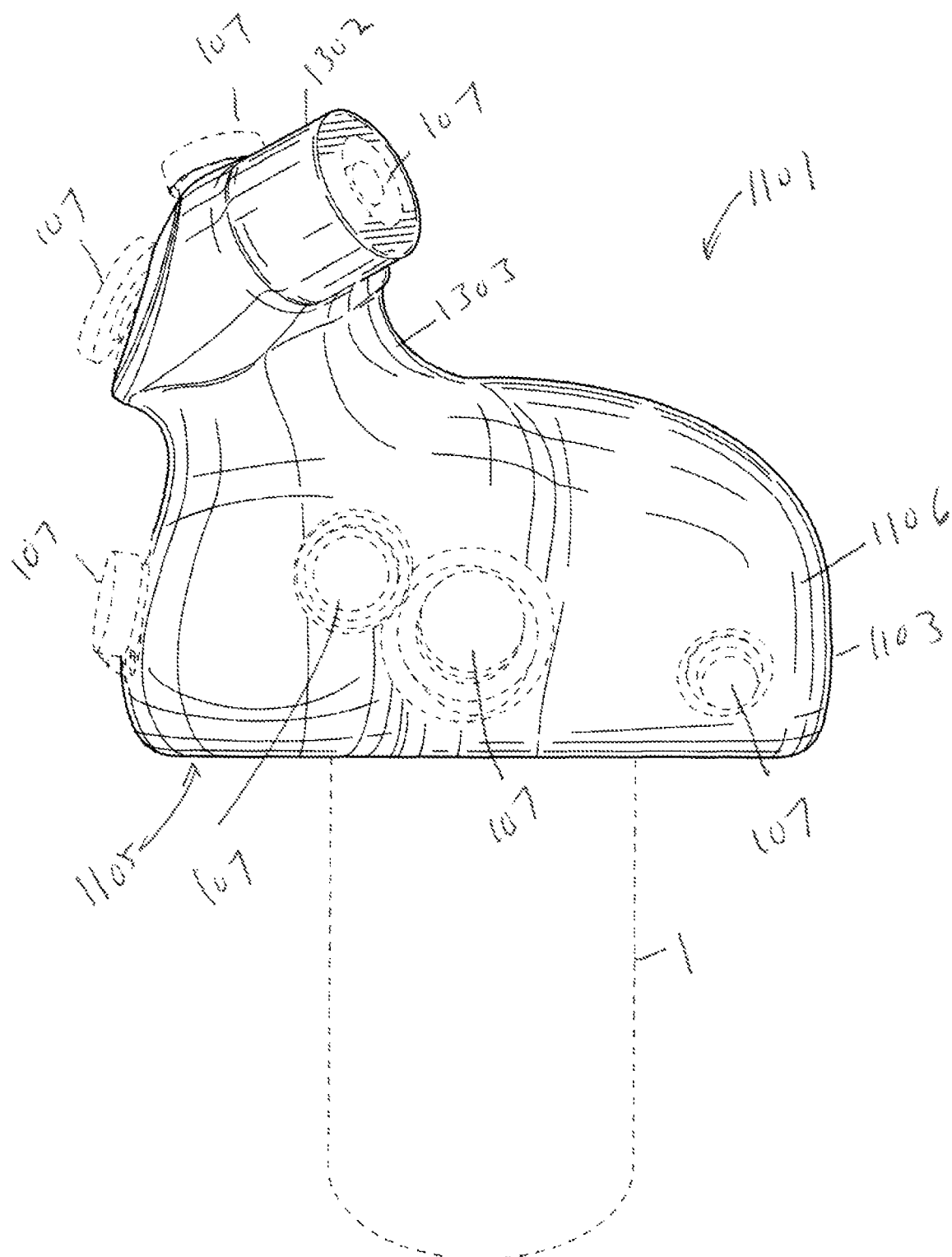
FIG. 16 provides a front view of the embodiment of FIG. 15.
Figure 17:
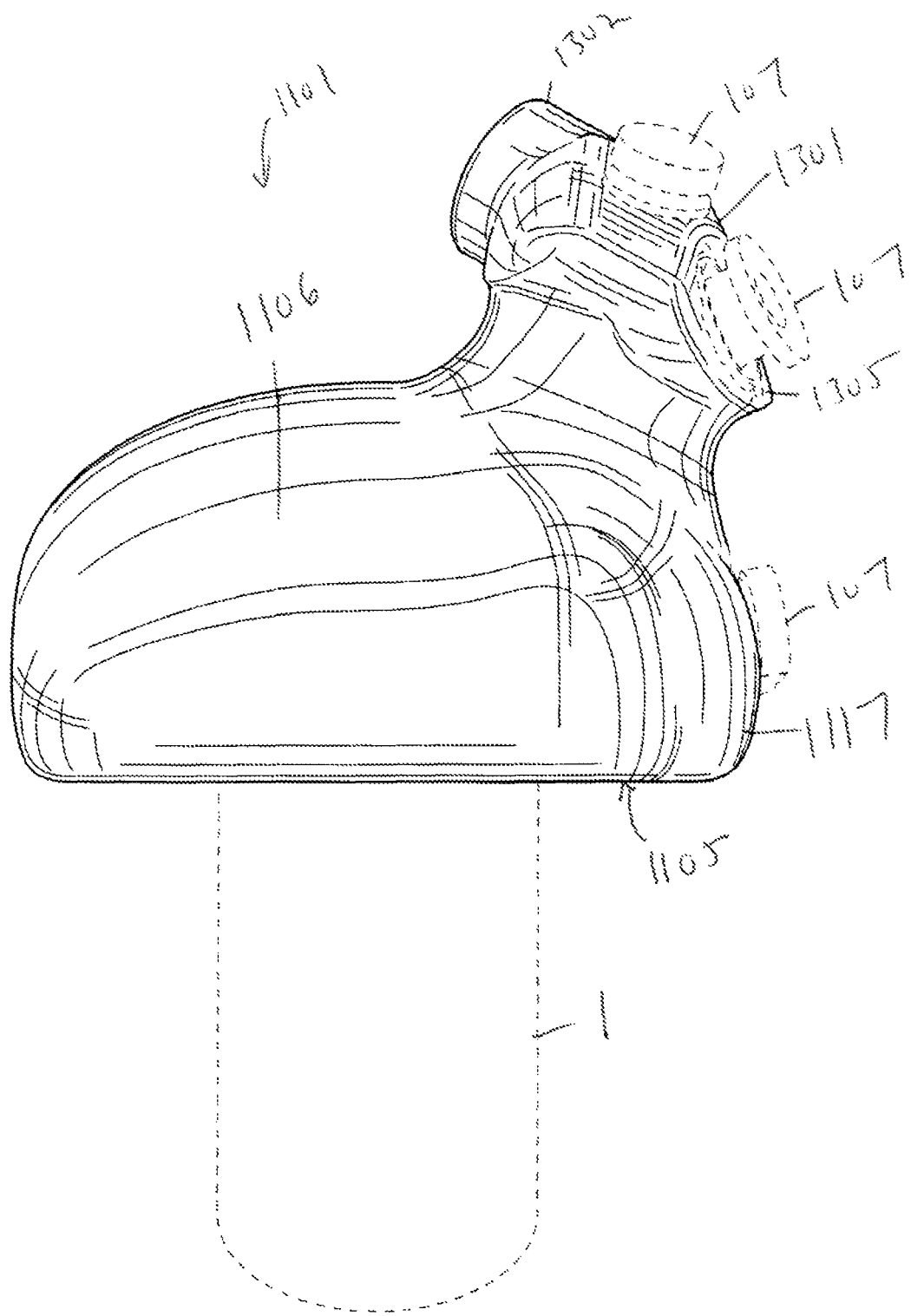
FIG. 17 provides a back view of the embodiment of FIG. 15.
Figure 18:
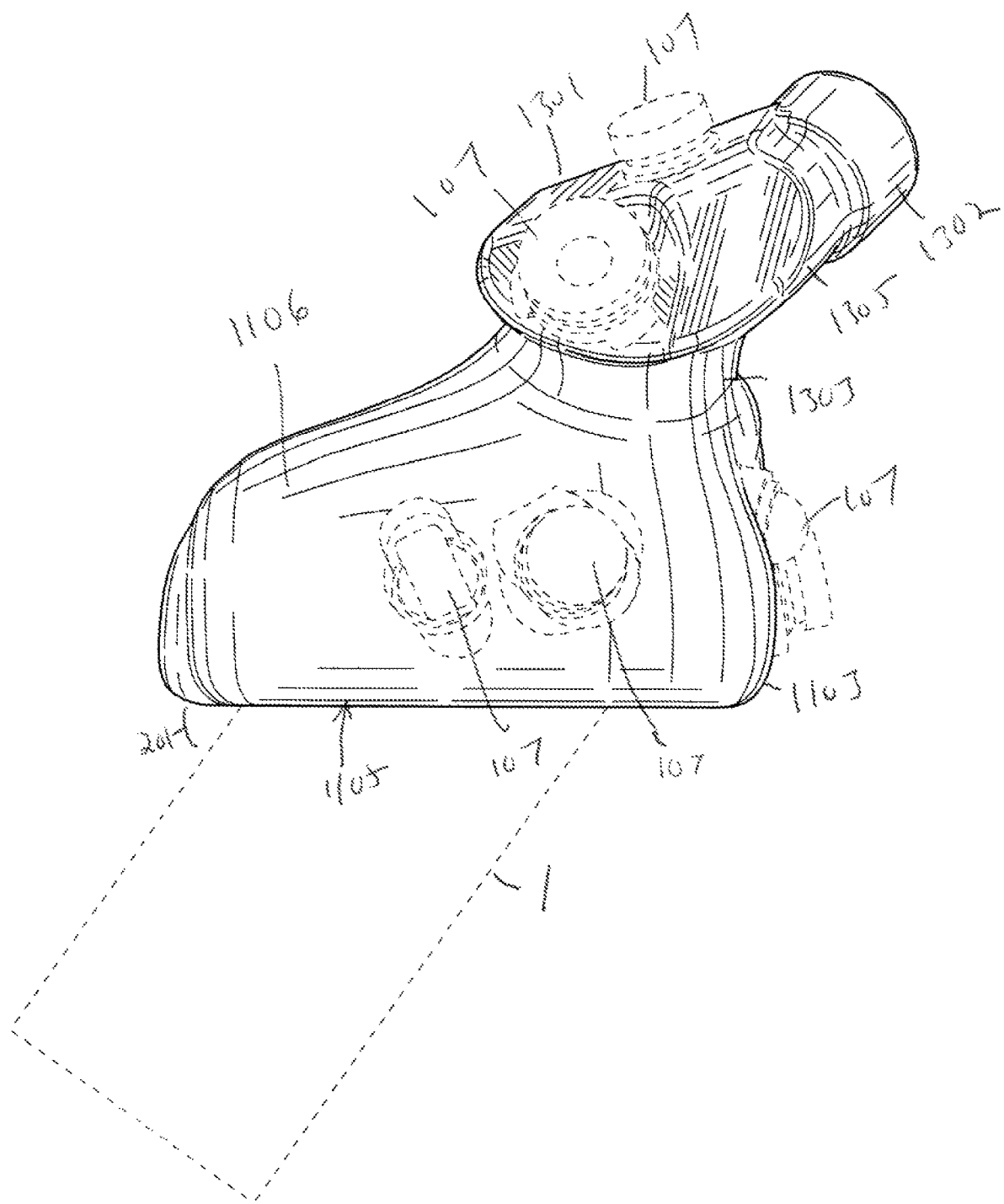
FIG. 18 provides a right side view of the embodiment of FIG. 15.
Figure 19:
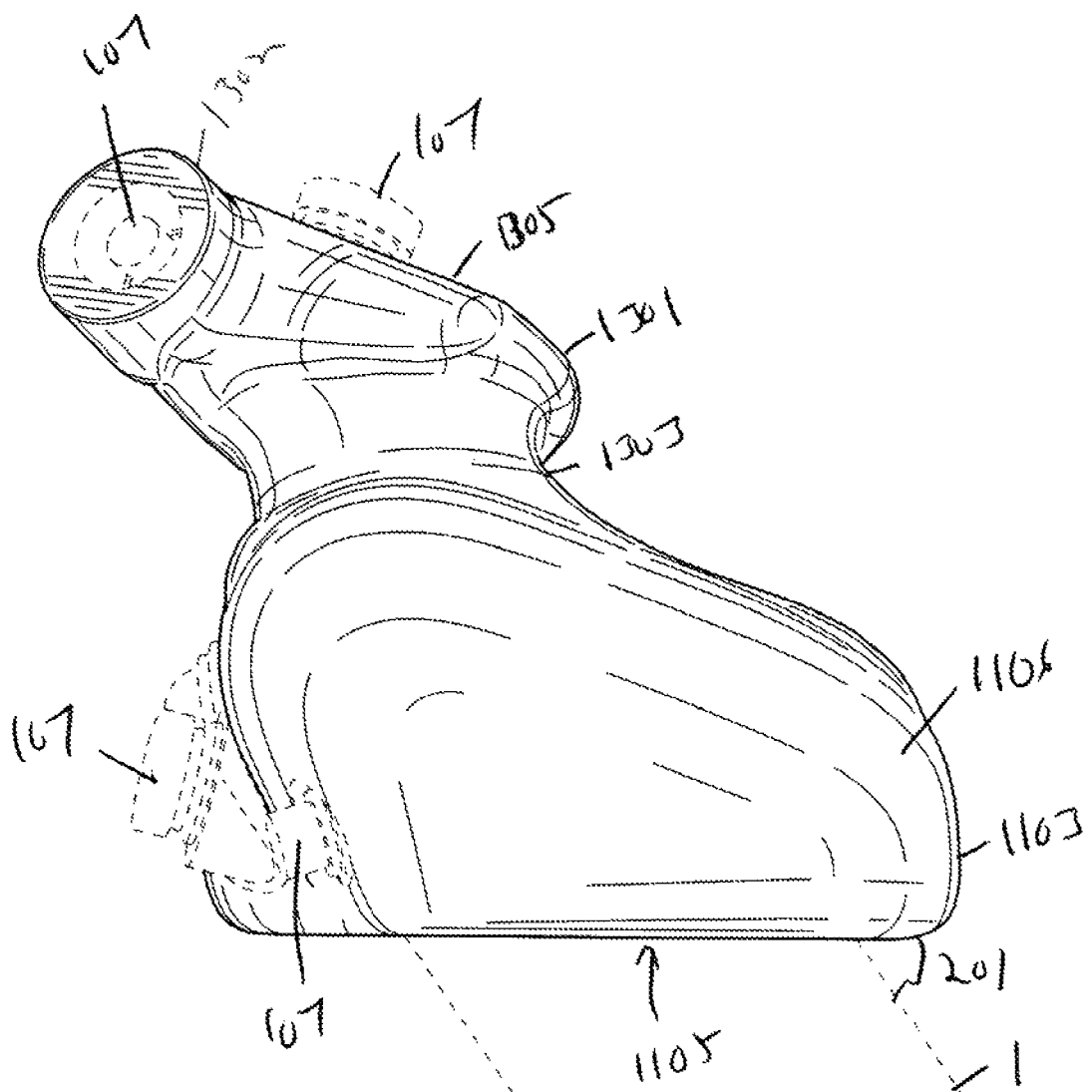
FIG. 19 provides a left side view of the embodiment of FIG. 15.
Figure 20:
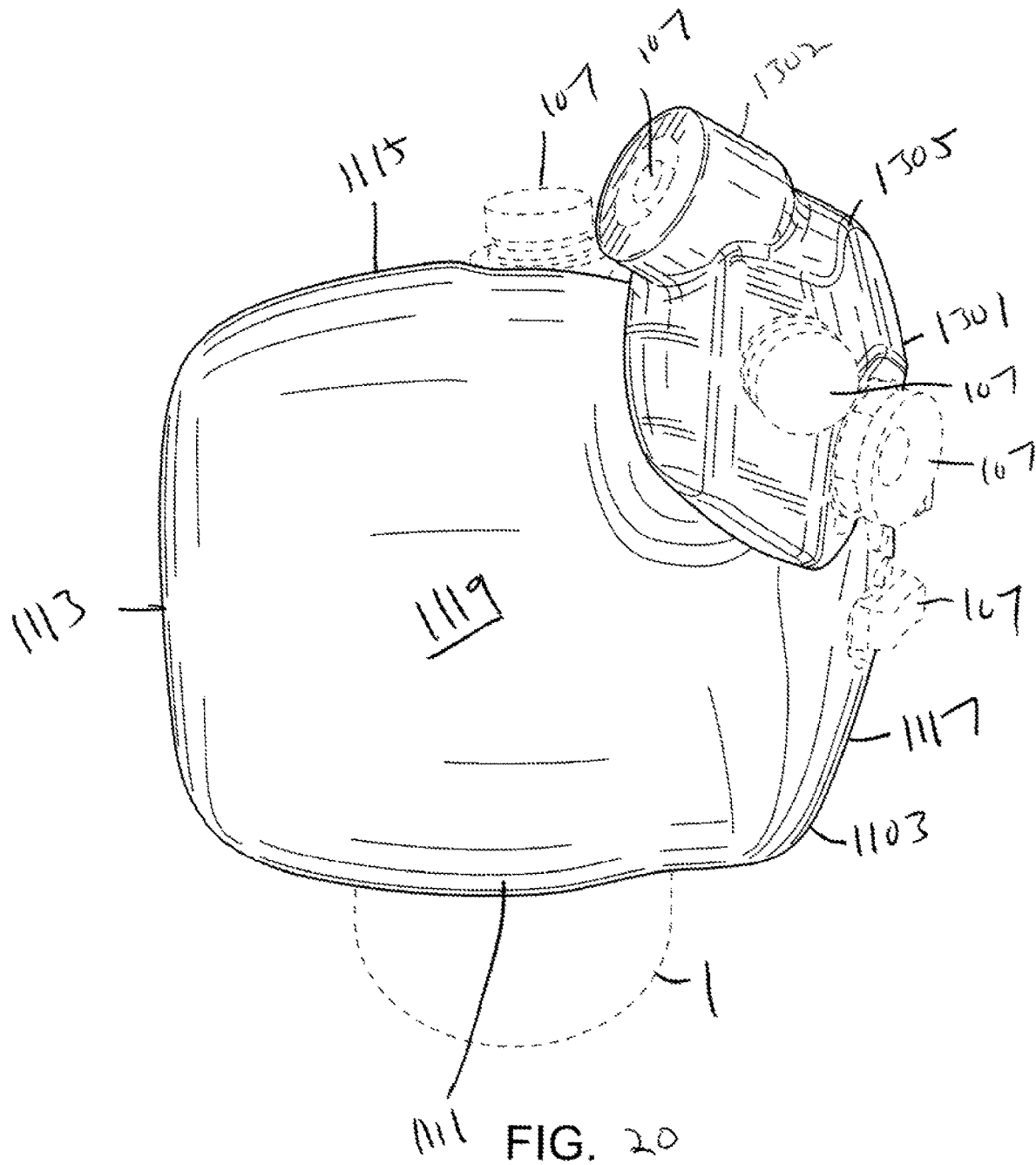
FIG. 20 provides a top view of the embodiment of FIG. 15.
Figure 21:
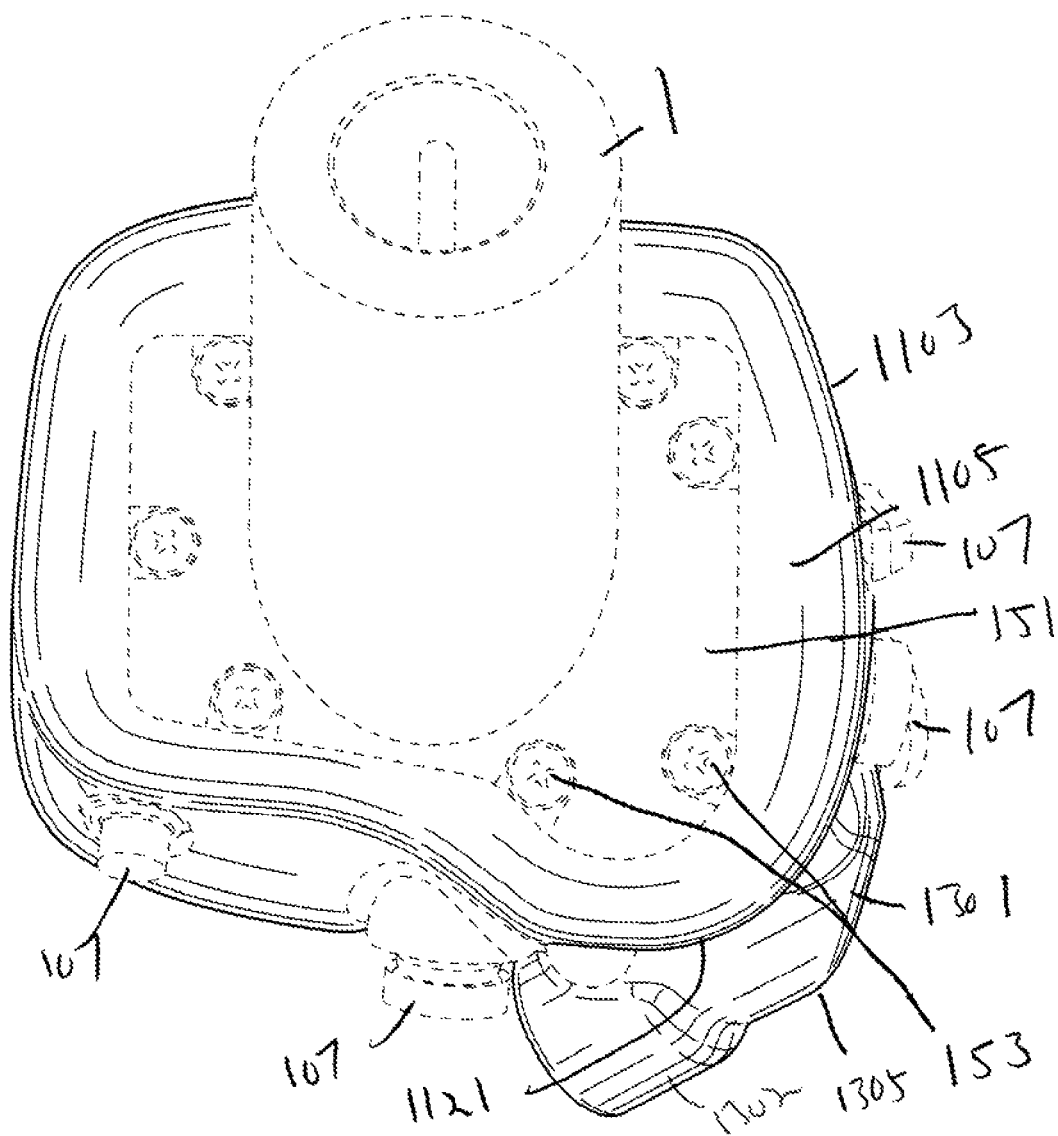
FIG. 21 provides a bottom view of the embodiment of FIG. 15.
Figure 22:
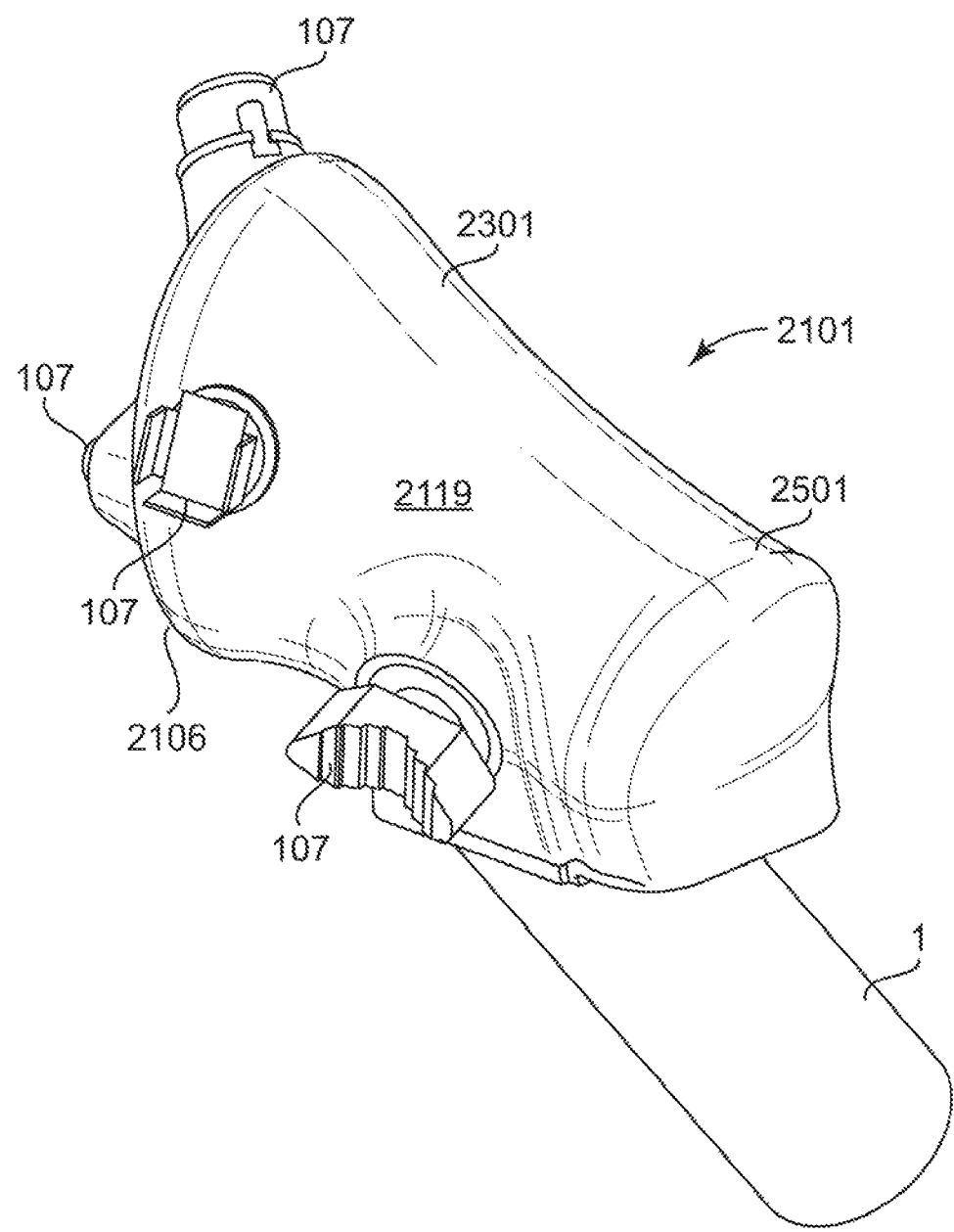
FIG. 22 provides a front and left perspective view of a third embodiment of a control system of the present invention.
Figure 23:
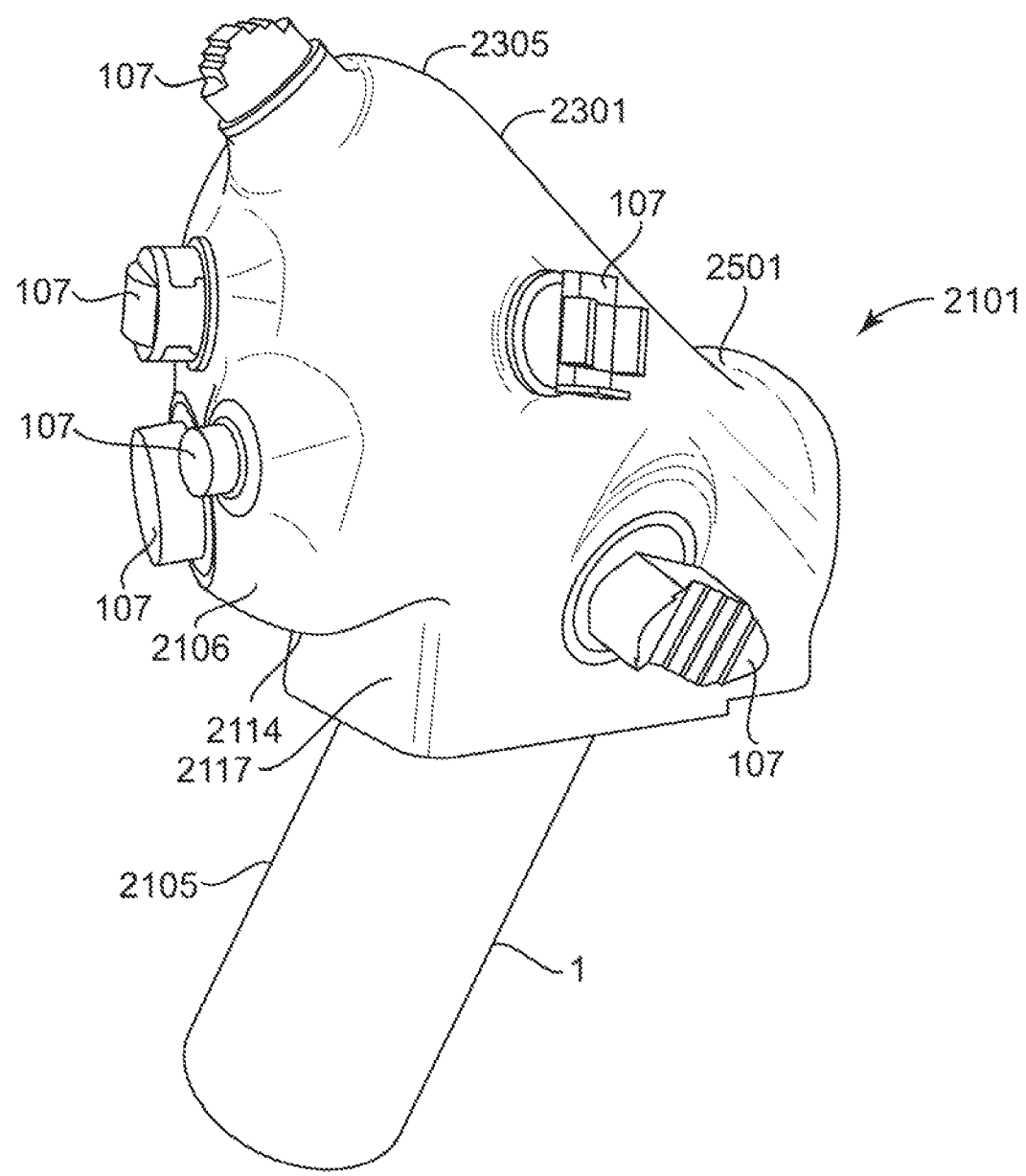
FIG. 23 provides a front and right perspective view of the embodiment of FIG. 22.
Figure 24:
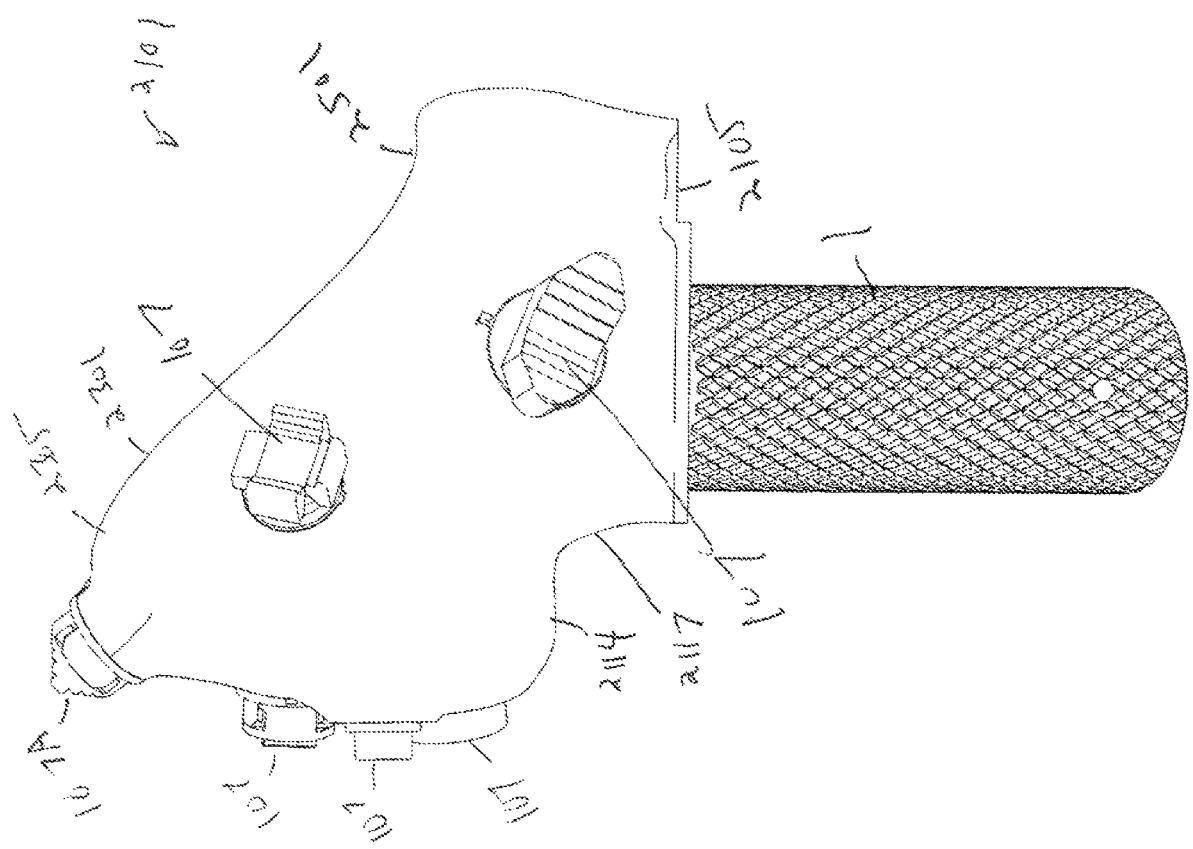
FIG. 24 provides a front view of the embodiment of FIG. 22.
Figure 25:
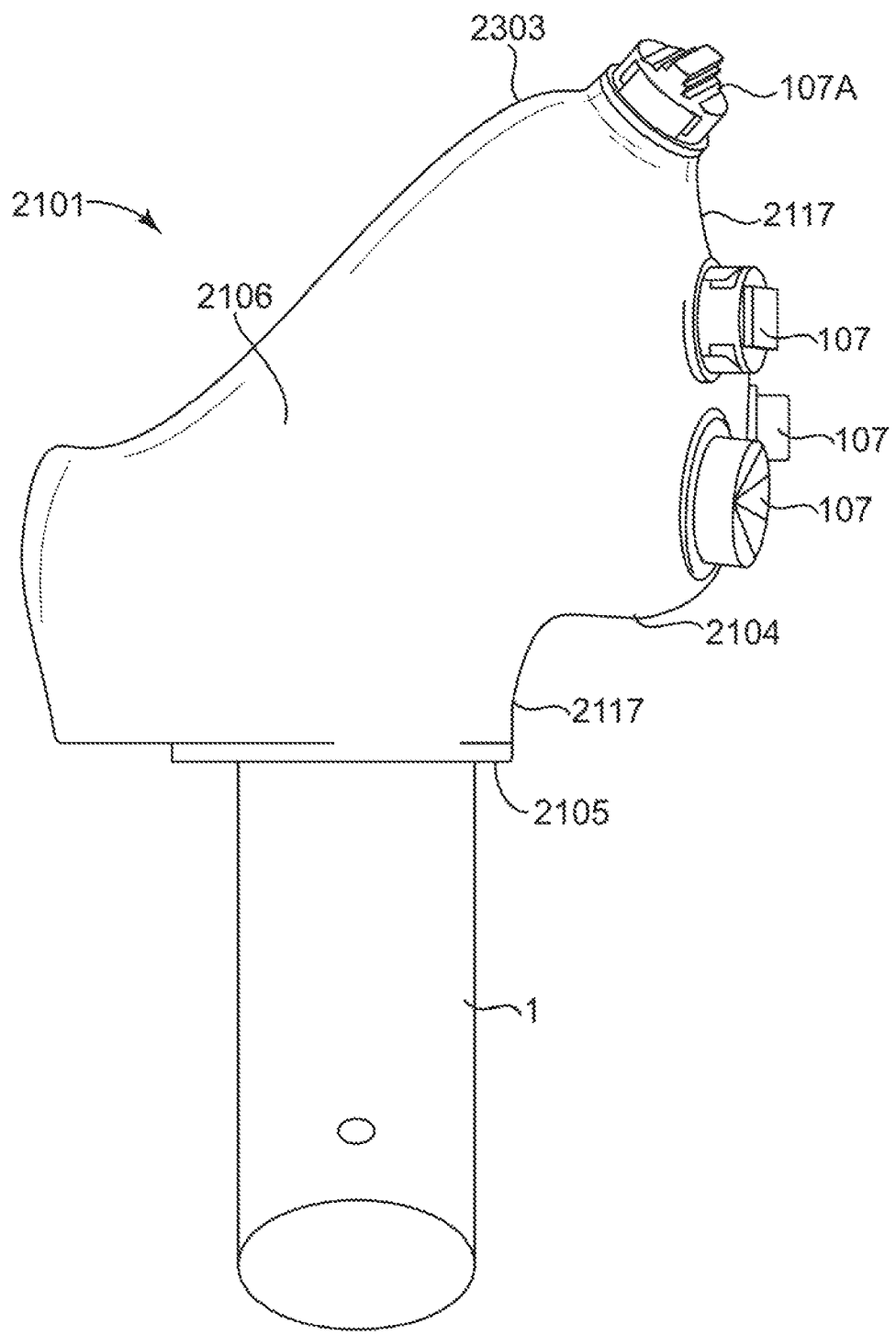
FIG. 25 provides a back view of the embodiment of FIG. 22.
Figure 26:
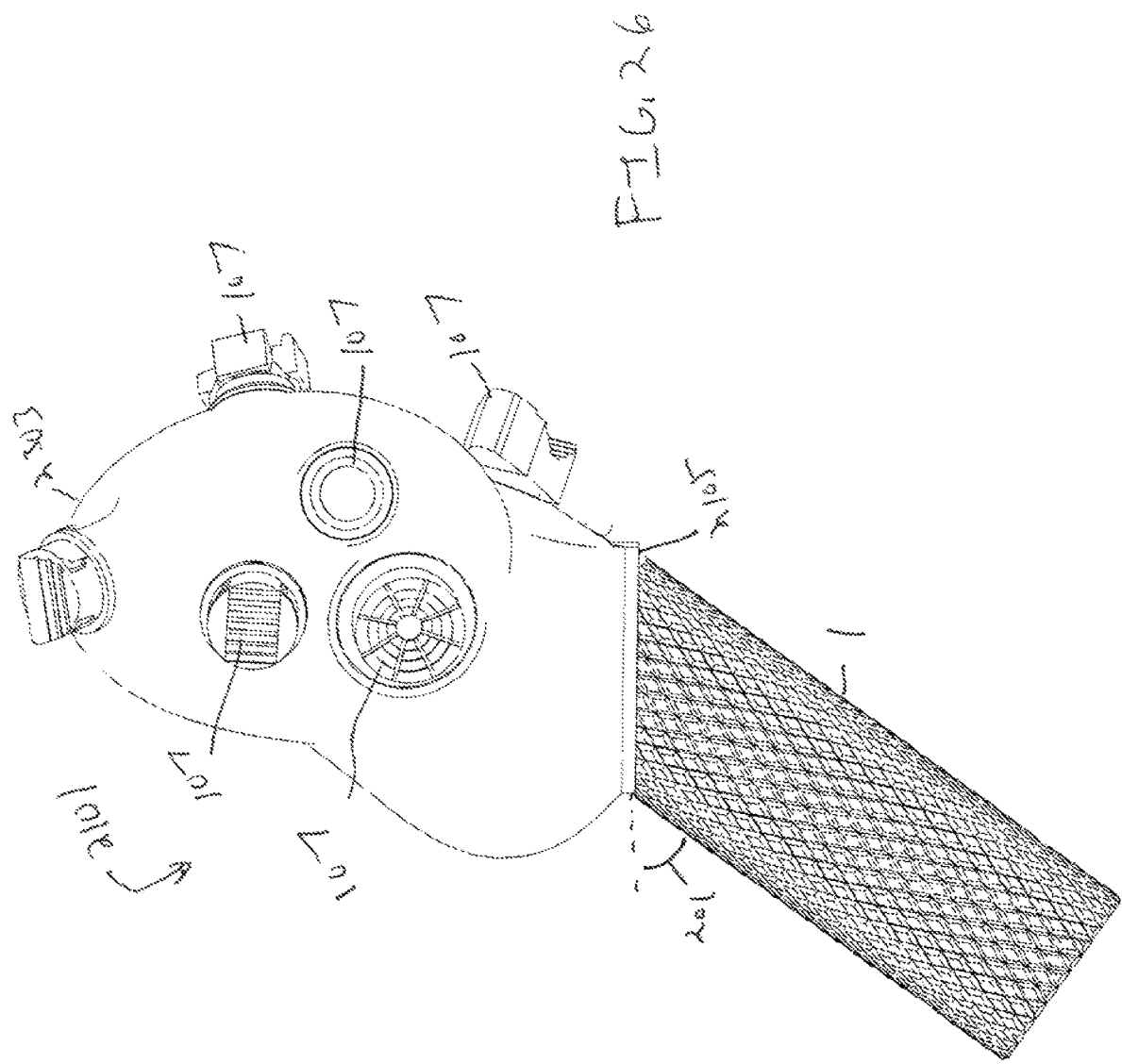
FIG. 26 provides a right side view of the embodiment of FIG. 22.
Figure 27:
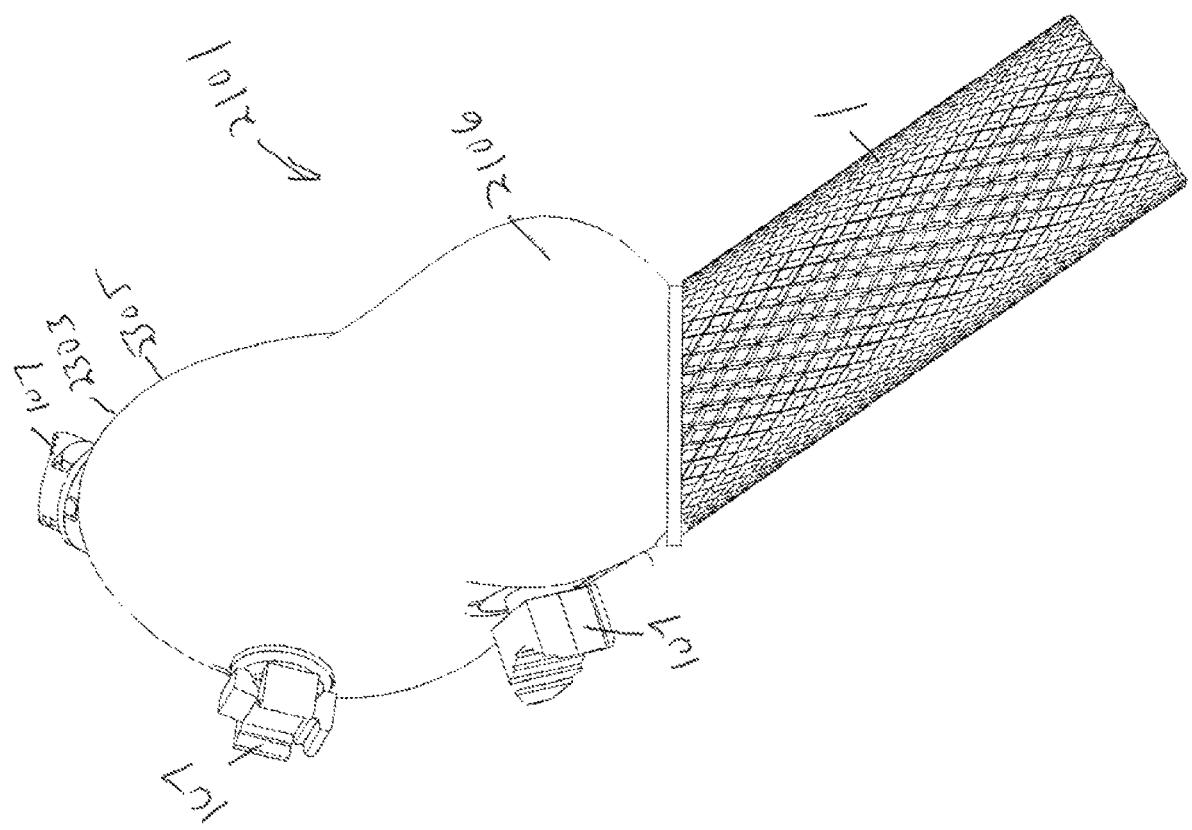
FIG. 27 provides a left side view of the embodiment of FIG. 22.
Figure 28:
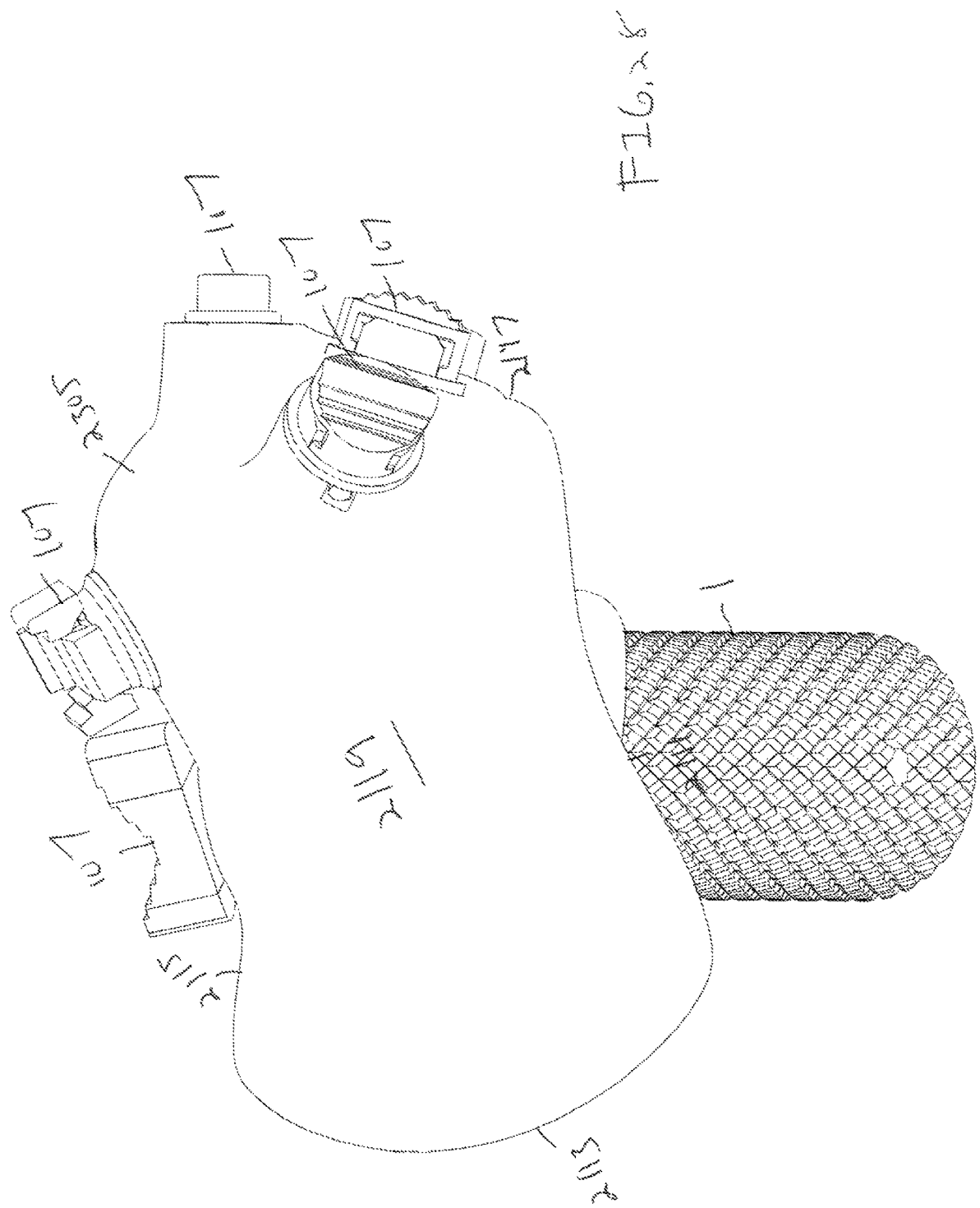
FIG. 28 provides a top view of the embodiment of FIG. 22.
Figure 29:
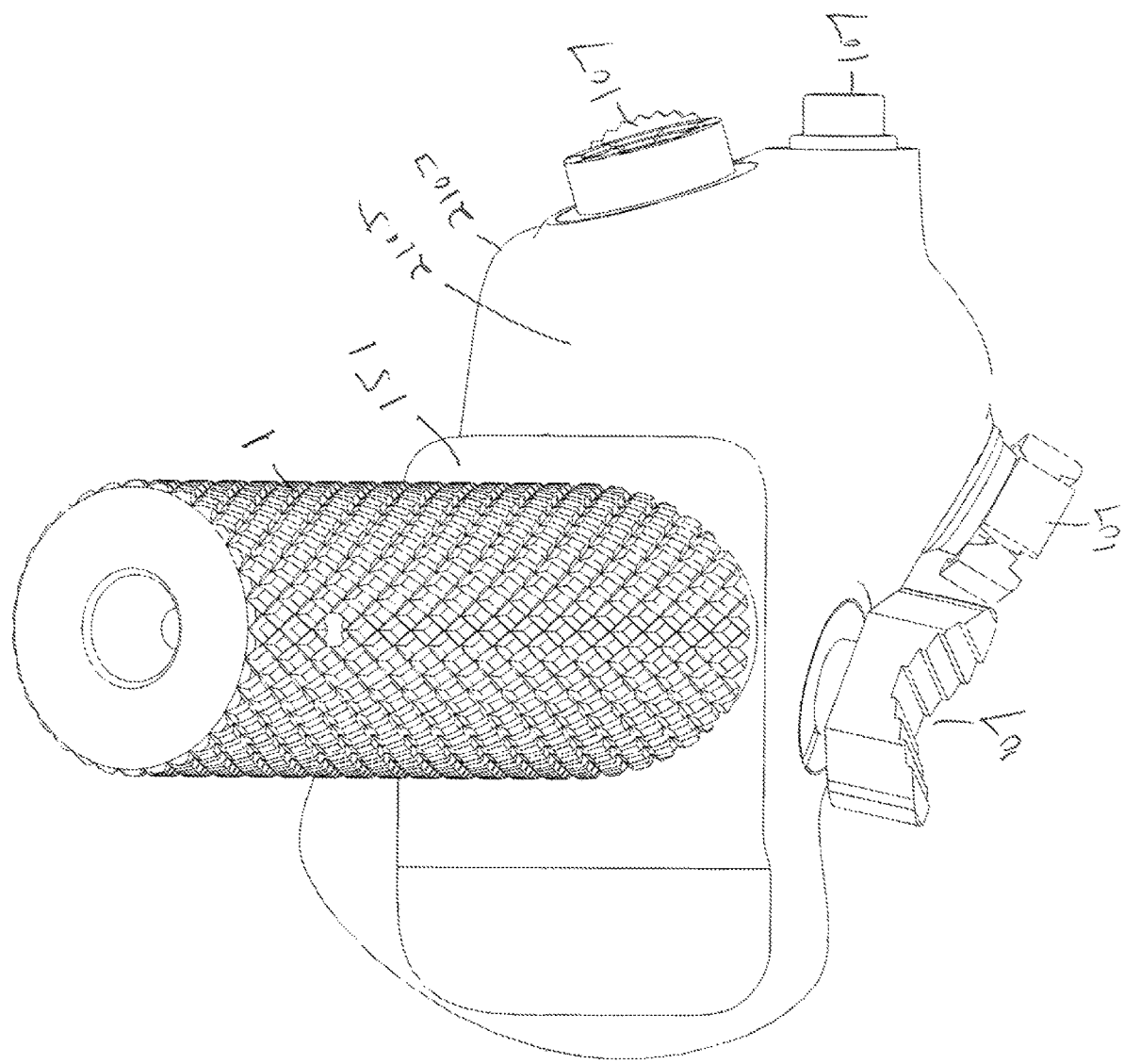
FIG. 29 provides a bottom view of the embodiment of FIG. 22.
Figure 30:
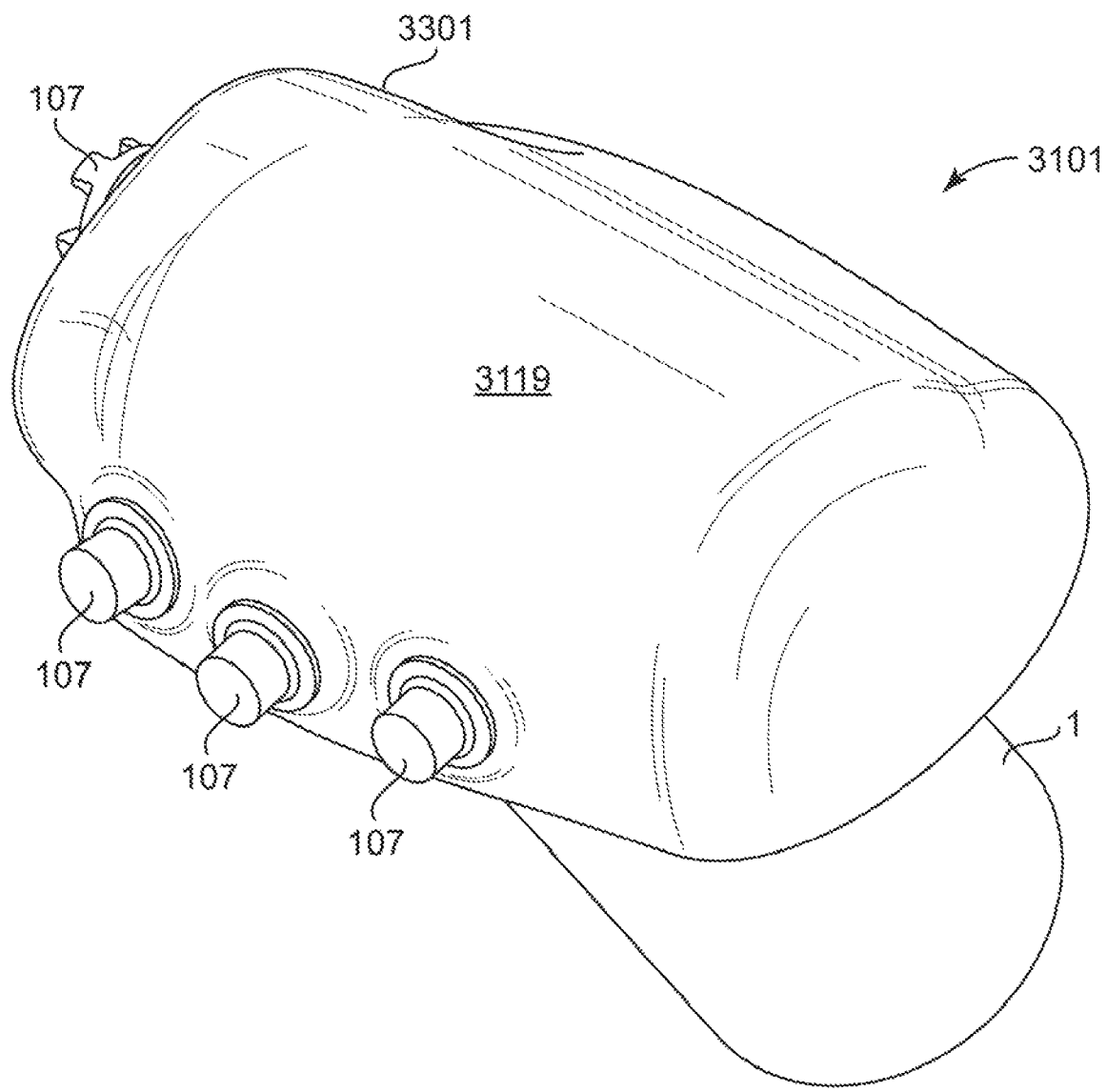
FIG. 30 provides a front and left perspective view of a second embodiment of a control system of the present invention.
Figure 31:
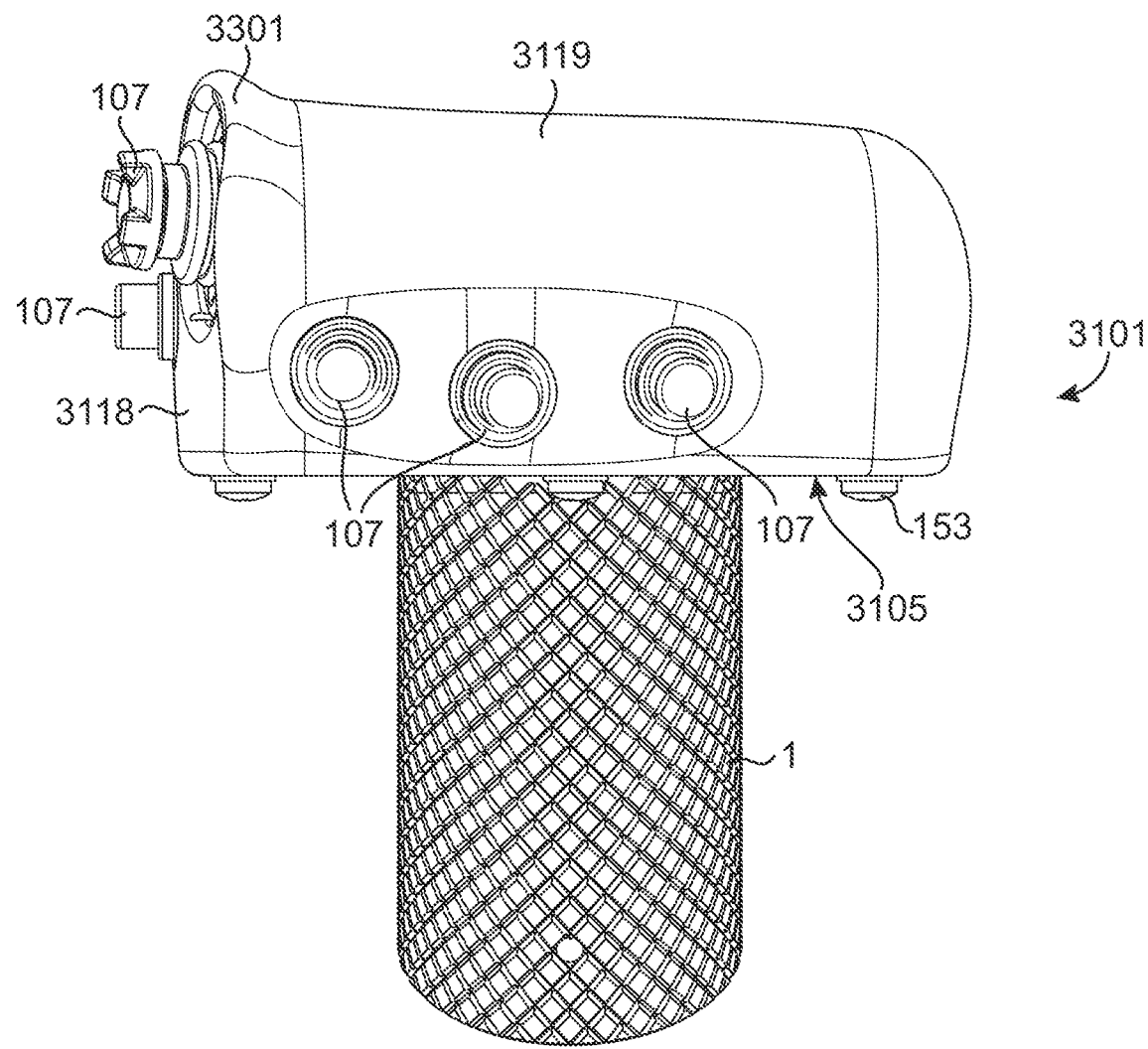
FIG. 31 provides a front view of the embodiment of FIG. 30.
Figure 32:
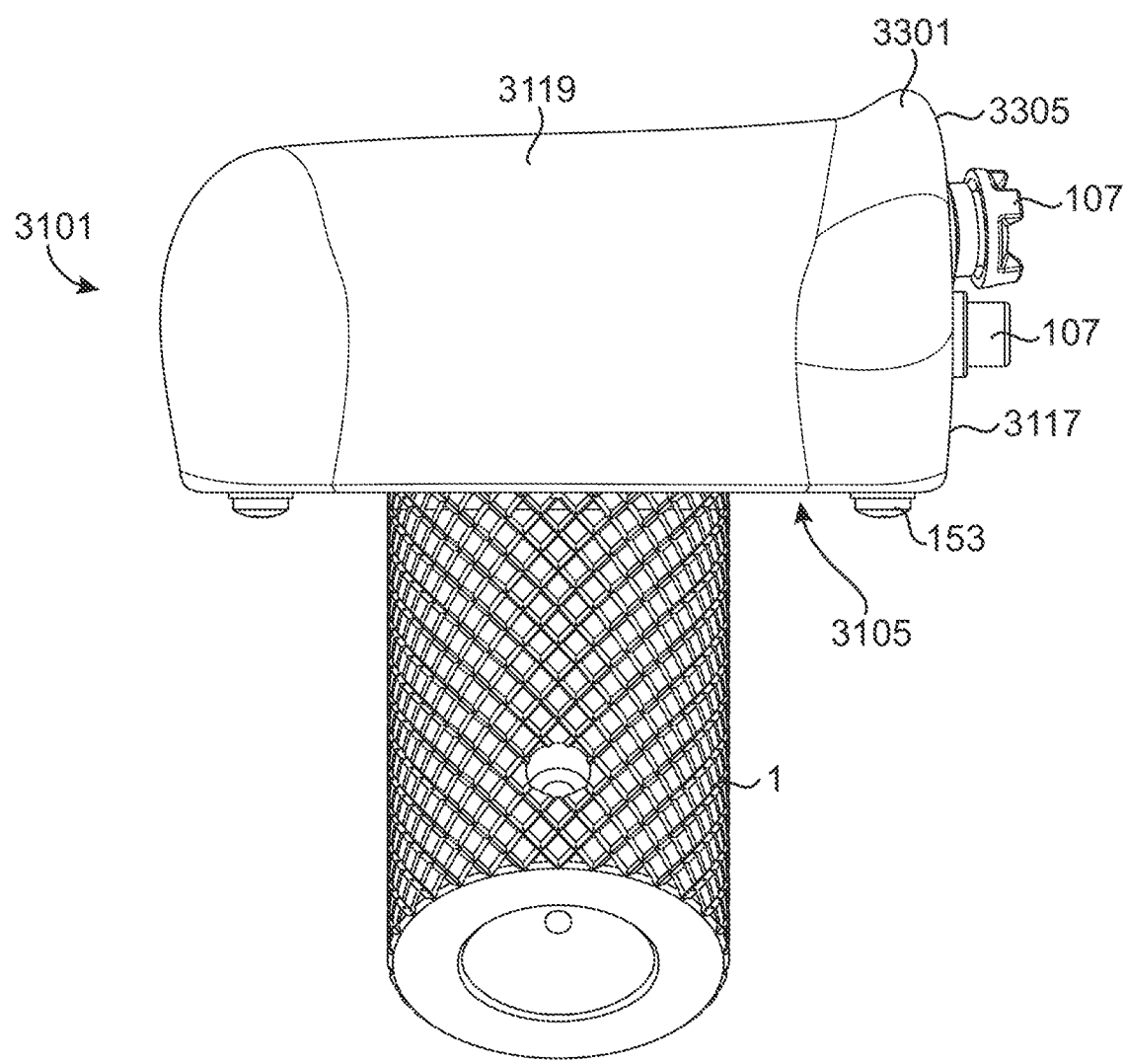
FIG. 32 provides a back view of the embodiment of FIG. 30.
Figure 33:
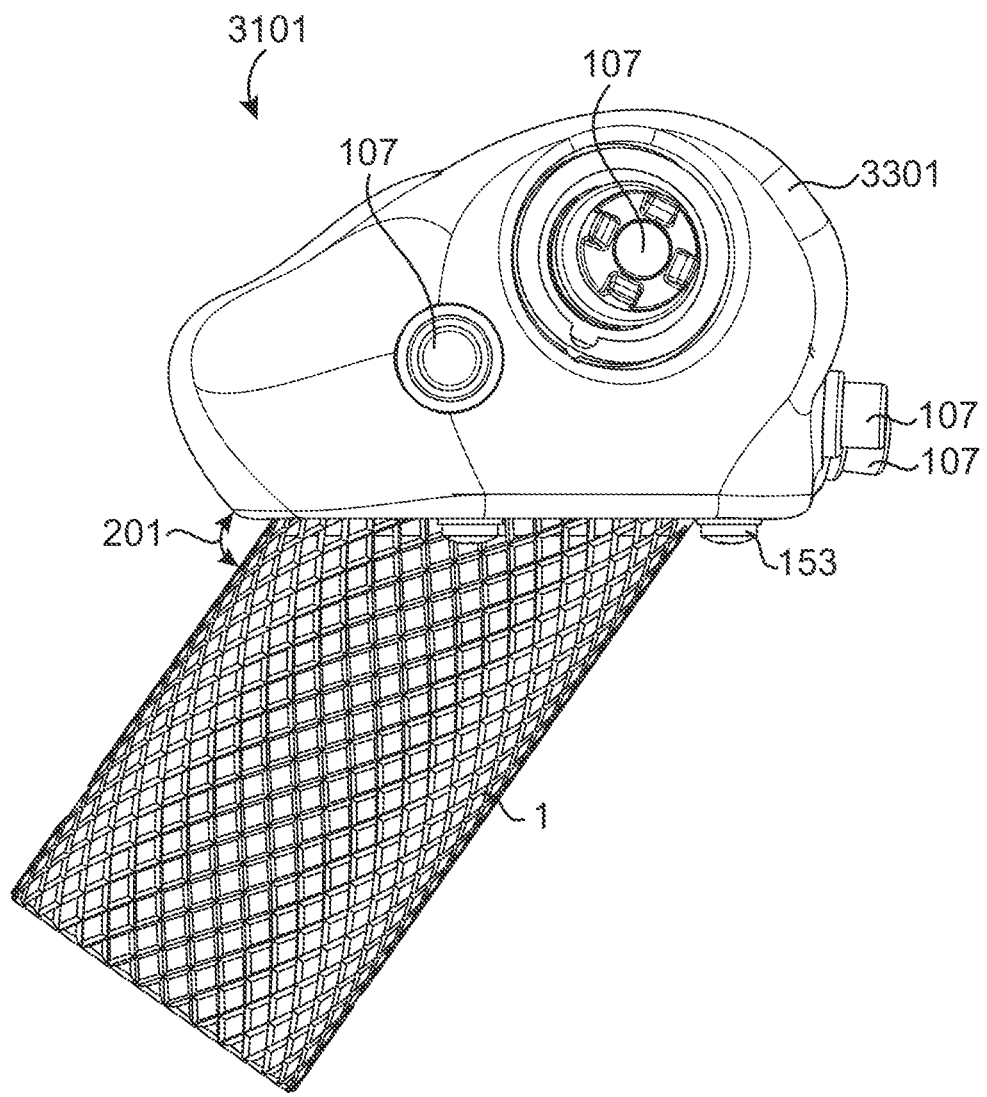
FIG. 33 provides a right side view of the embodiment of FIG. 30.
Figure 34:
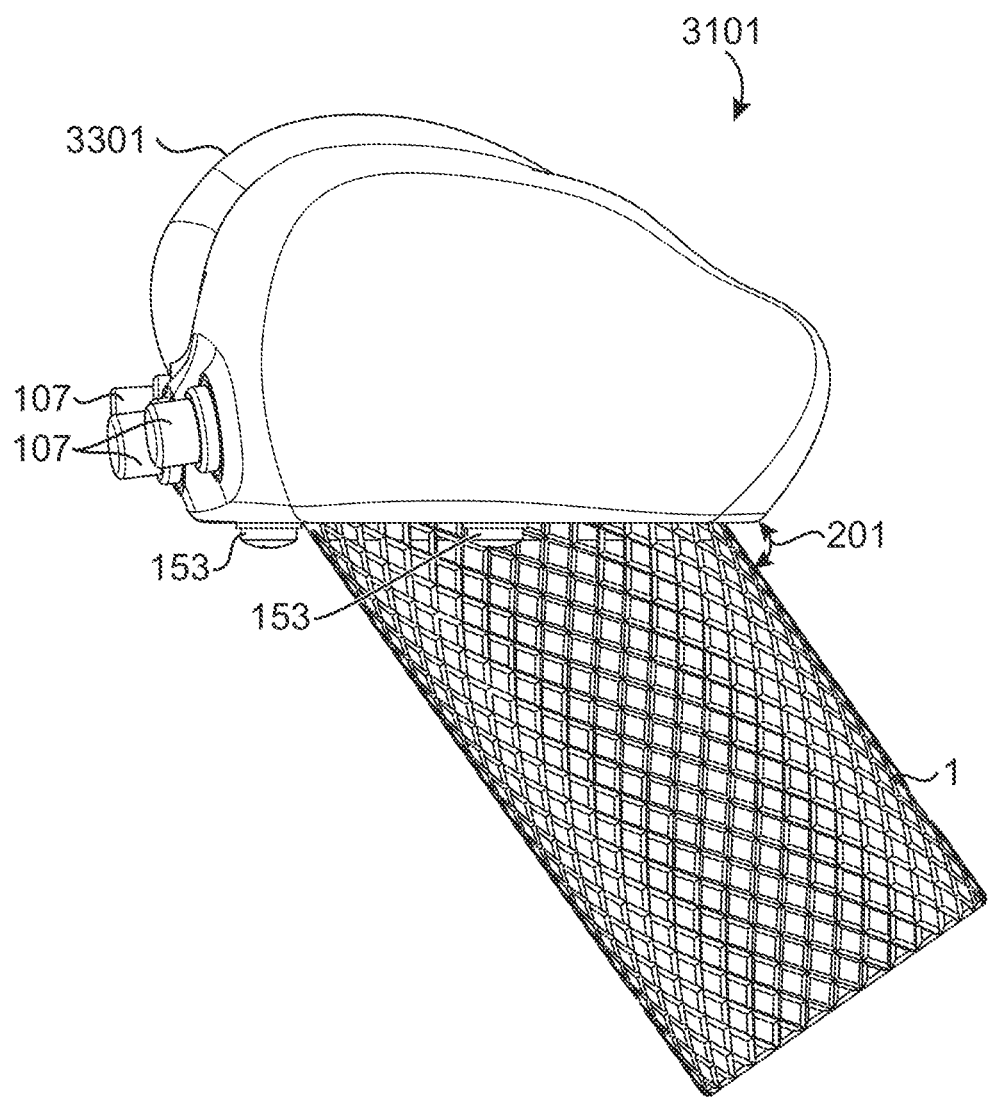
FIG. 34 provides a left side view of the embodiment of FIG. 30.
Figure 35:
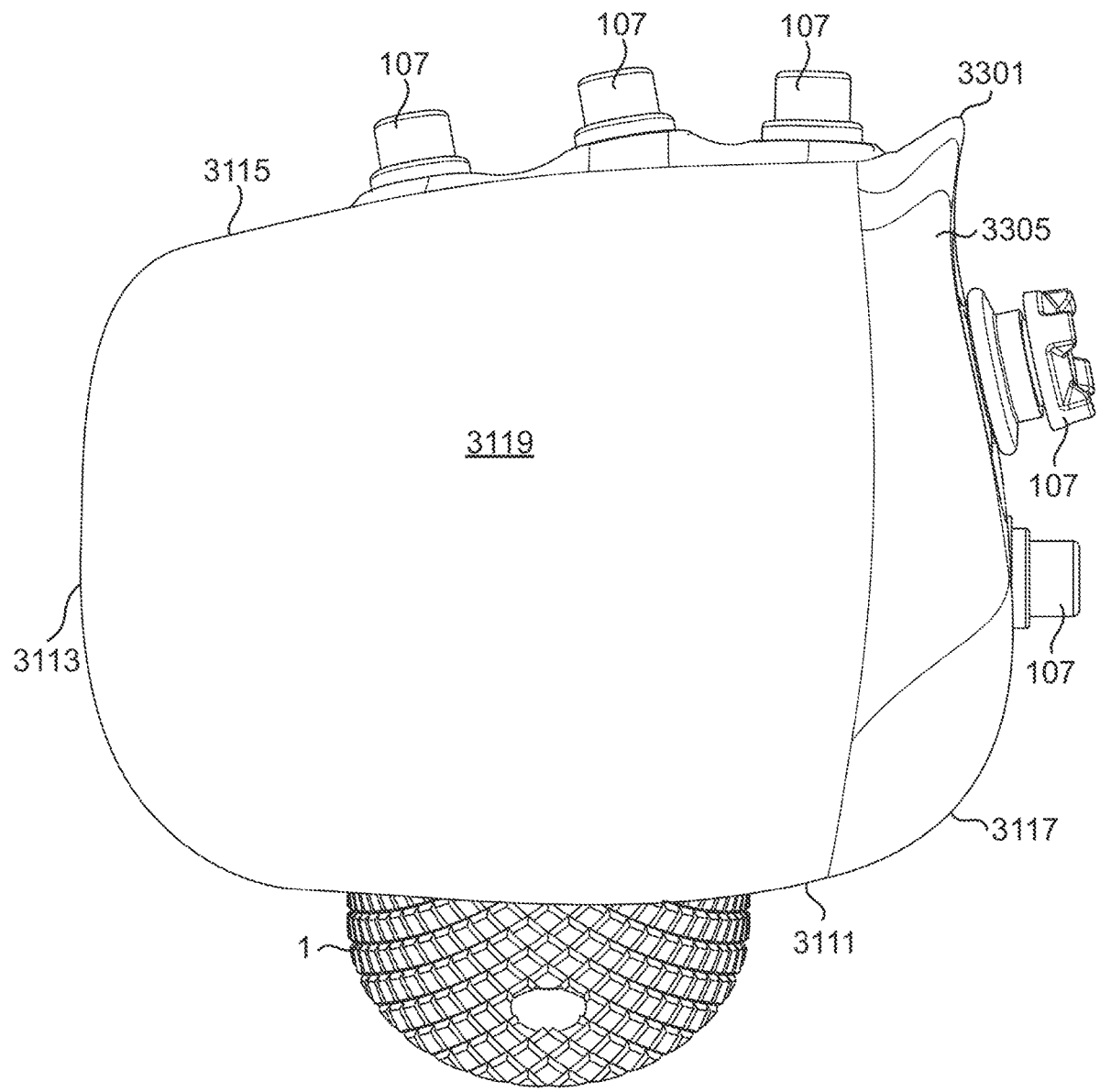
FIG. 35 provides a top view of the embodiment of FIG. 30.
Figure 36:
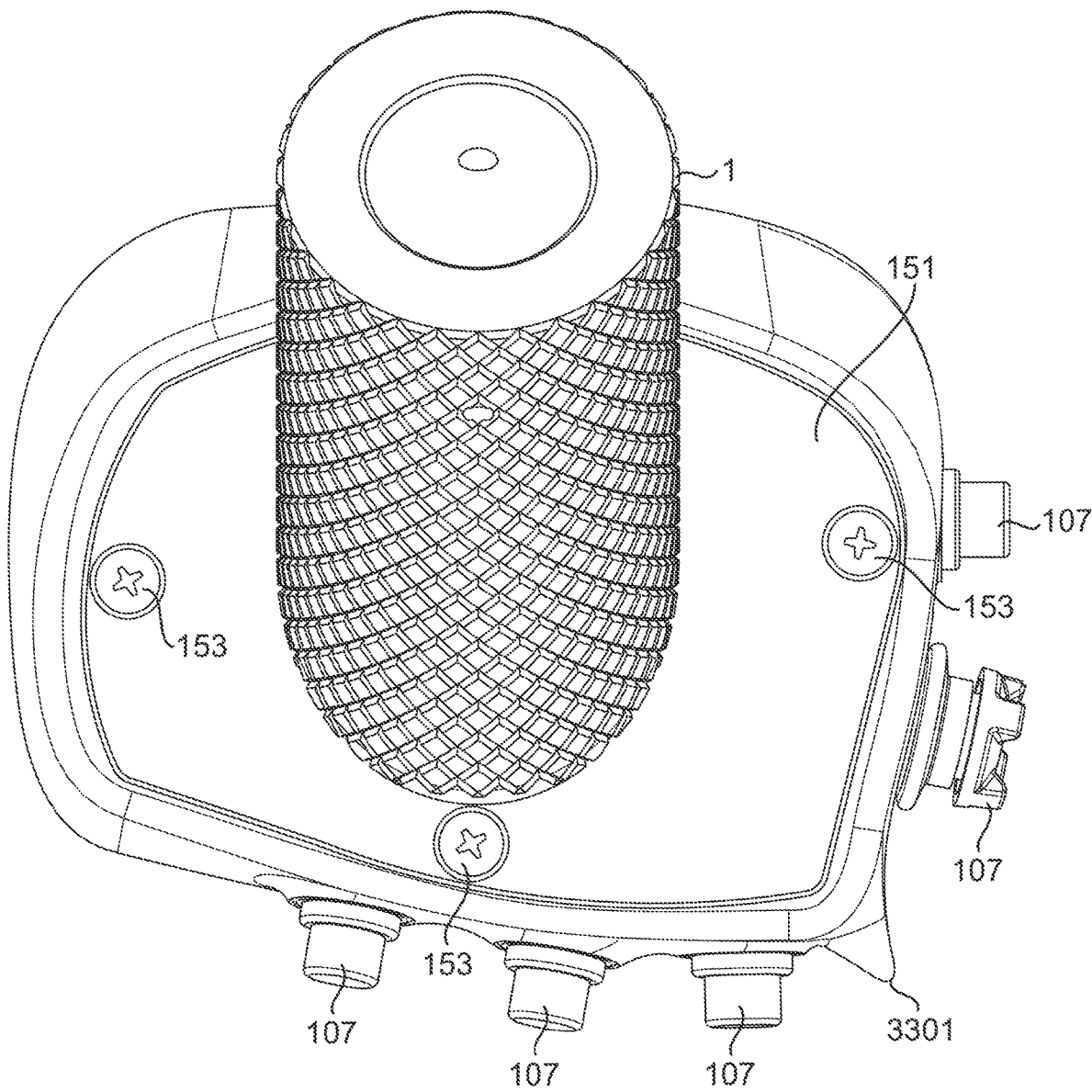
FIG. 36 provides a bottom view of the embodiment of FIG. 30.

While the embodiments as discussed above share a number of common features, they are also relatively different in their shape and orientation. This disclosure, will therefore discuss the specific shapes of the various embodiments. As can be best seen in FIGS. 7 and 8 the first embodiment provides that the horizontal cross section of the main body (103) will typically have a loosely square or "squircle" (square with rounded corners) shape. The main body (103) in the cross section of the embodiment of FIGS. 2-8 also includes an extended corner (121) as best seen in FIG. 8. The second embodiment of FIGS. 15-21 has an essentially identical shape to main body (1103) as can be best seen in FIGS. 20-21.

The extended corner (121) and (1121) is present in the embodiments of FIGS. 2-8 and FIGS. 15-21 to act as a support for the horn portion (301) or (1301) of the system (101) or (1101). In both embodiments, the horn portion (301) or (1301) comprises an extension portion (303) or (1303) and a larger support portion (305) of (1305) arranged at the top. The horn portions (301) and (1301) are, thus, generally in the shape of bulbous mushrooms and can be considered generally mushroom-shaped or umbrella-shaped. However, as can be seen in FIGS. 2-8 and 15-21, the "cap" of the mushroom or canopy of the umbrella is not of regular shape, however it may be in alternative embodiments.

As can be best seen in FIG. 7, the first embodiment of the horn portion (301) in horizontal cross section provides a support portion (305) or cap of the mushroom that is of loosely acute trapezoid or trapezium shape but this is by no means required. This results in the support portion (305) having a generally non-conical frustum shape. The shape of the support portion (305), like the main body portion (103), is typically selected to provide for mounting positions for controls and therefore the nature of the control and how the fingers or thumb will interact with it will typically dictate the specific shape of the support portion (305). In the second embodiment, the horn portion (1301) is of similar shape, but has a clear extension (1302) which is generally in the form of a cylinder extending therefrom.

Turning to the third embodiment of FIGS. 22-29 it should be apparent that this structure is a little different from the prior two embodiments, but still holds the same basic shape and arrangement with a main body (2103) and attached horn portion (2301). Most notably, the third embodiment does not utilize a separated horn portion having the loose "mushroom" shape of the first and second embodiments, instead the extension portion (2303) and support portion (2305) are more interconnected and of similar size so as to present a horn portion (2301) more free flowing from the main body (2103). This provides a structure with the two portions (main body (2103) and horn portion (2301)) appearing more integral. The third embodiment, therefore, has a shape which is loosely more monolithic in appearance than the first and second embodiments as the horn portion (2301) appears more directly flowing from the main body (2103) than the horn portion (301) appears to be relative the main body (103).

In the third embodiment (FIGS. 22-29), the horizontal cross section of the main body (2103) will typically have a loosely rectangular or other quadrilateral shape and while it can have rounded corners, will commonly be less square than the main body (103) of the first embodiment and will lack the extended corner (121) as, in many respects, the whole side (2117) extends. It should be noted that, as can be best seen in FIG. 25, the main body (2103) need not extend fully at the base (2105) providing an overhang (2104) depending on exactly where the main body (2103) is indicated to end and the horn portion (2301) is considered to start. Due to the more flowing nature of the third embodiment, a specific line of demarcation between the main body (2103) and horn portion (2301) is effectively not possible.

The third embodiment is generally more saddle-shaped than the first or second embodiment including the depression (2501) which will generally assist with keeping the hand from sliding off the main body (2103) as the hand positioned on the third embodiment will often be tilted with the palm more the right and less directed downward than it was for the first or second embodiment. It should also be apparent that while horn portion (2301) does not include a clear extension portion (303) and support portion (305), some of the controls (107) are still positioned in a manner on the horn portion (2301) which allows for thumb movement between different sets of controls (107) as contemplated later in this document. Thus, some controls (107) are positioned lower on the side (117) while one exemplary control (107A) is positioned higher in the depicted embodiment. This later control (107A) is effectively positioned on the "support portion" of the horn portion (2301) while such element is not really distinct 1*n* this embodiment.

The fourth embodiment is essentially a variation on the third embodiment and shows an even more integrated horn portion (3301). In the fourth embodiment, the horizontal cross section of the main body (3103) again has a loosely rectangular or other quadrilateral shape and while it can have rounded corners, will commonly be less square than the main body (103) of the first embodiment and will lack the extended corner (121). As opposed to the third embodiment, the fourth embodiment does not include a clearly distinct elongated horn portion (2301) as the horn portion (3301) of the fourth embodiment is effectively formed by simply extending the structure around the side (3117) to give it a somewhat bulbous appearance. The side (3117) is, thus, effectively a little larger than the side (3113) giving the main body (3103) an asymmetrical appearance from the front as can be seen best in FIG. 36. This provides for a much more parallelepiped appearing shape from the front as opposed to the other three embodiments which provide for a more distinct horn portion (301), (1301), or (2301). It should also be apparent that, like in the third embodiment, while a separated support portion is not formally included in the fourth embodiment, some of the controls (107B) are positioned higher on the side (3117) and in a manner which allows for thumb movement between different sets of controls (107) as some are positioned lower on the side (3117). Thus, at least one control (107B) is positioned higher relative the other controls (107) and is effectively positioned on the support portion (3305). Further, there is provided a blank area (3118) where the thumb can be rested without being in contact with any control (107).

Regardless of the embodiment of control system (101), (1101), (2101), or (3101), the purpose is generally to provide for comfortable positioning of the hand on the main body (103), (1103), (2103), or (3103) and to provide for the fingers and/or thumb to have easy access to controls (107). The controls (107) are universally labeled both within each embodiment and across the embodiments since, as discussed above, the controls (107) are essentially interchangeable as a matter of design choice. One of the aspects of the various embodiments of control systems (101), (1101), (2101), and (3101) is also that the controls (107) are still primarily activated by the thumb, thus, the thumb is expected to move both on and off controls (107) and between different controls (107) while each finger will commonly only move on or off a single control (107).

Figure 2:
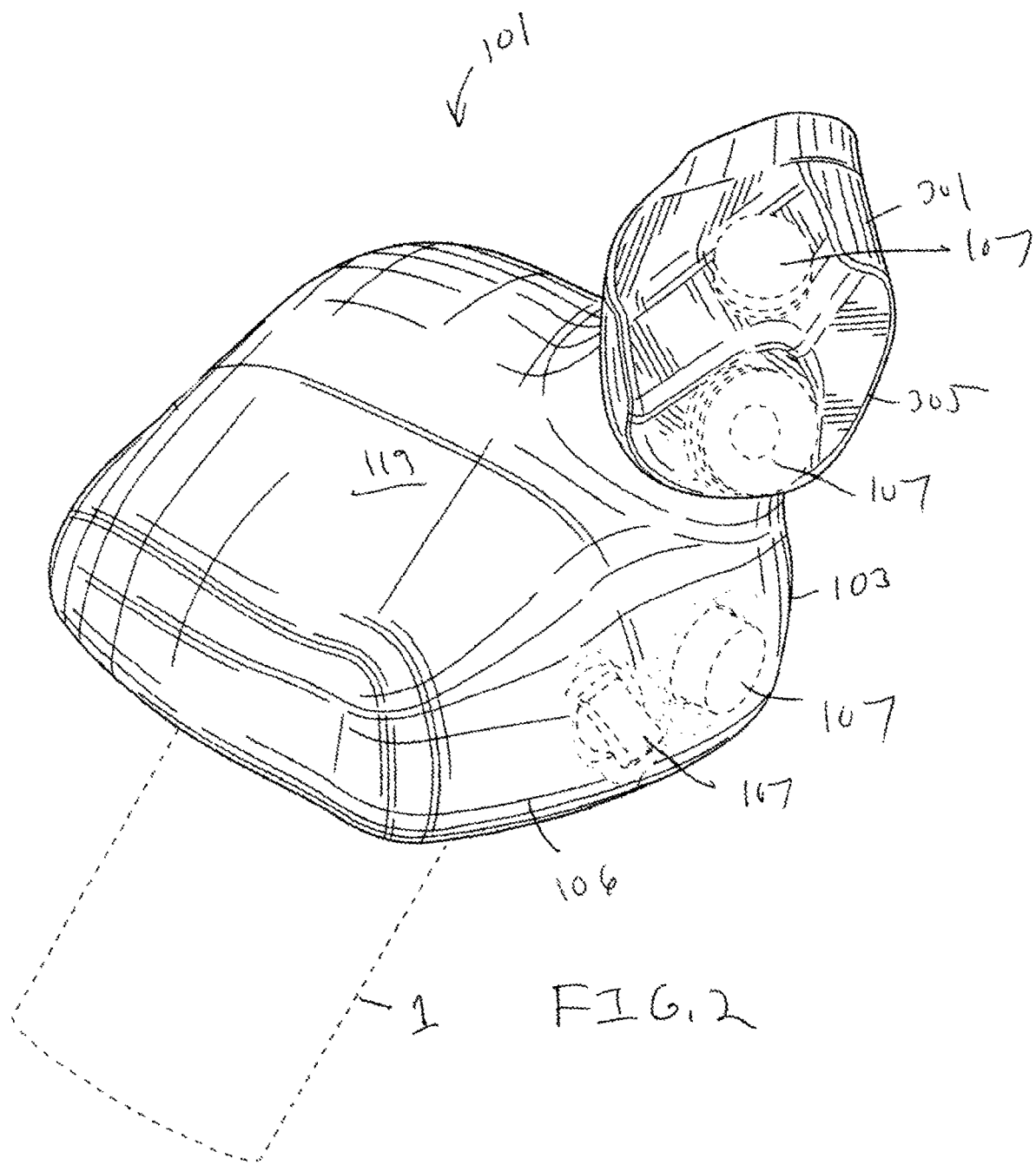
FIG. 2 provides a back and right perspective view of an embodiment of a control system of the present invention.
Figure 3:
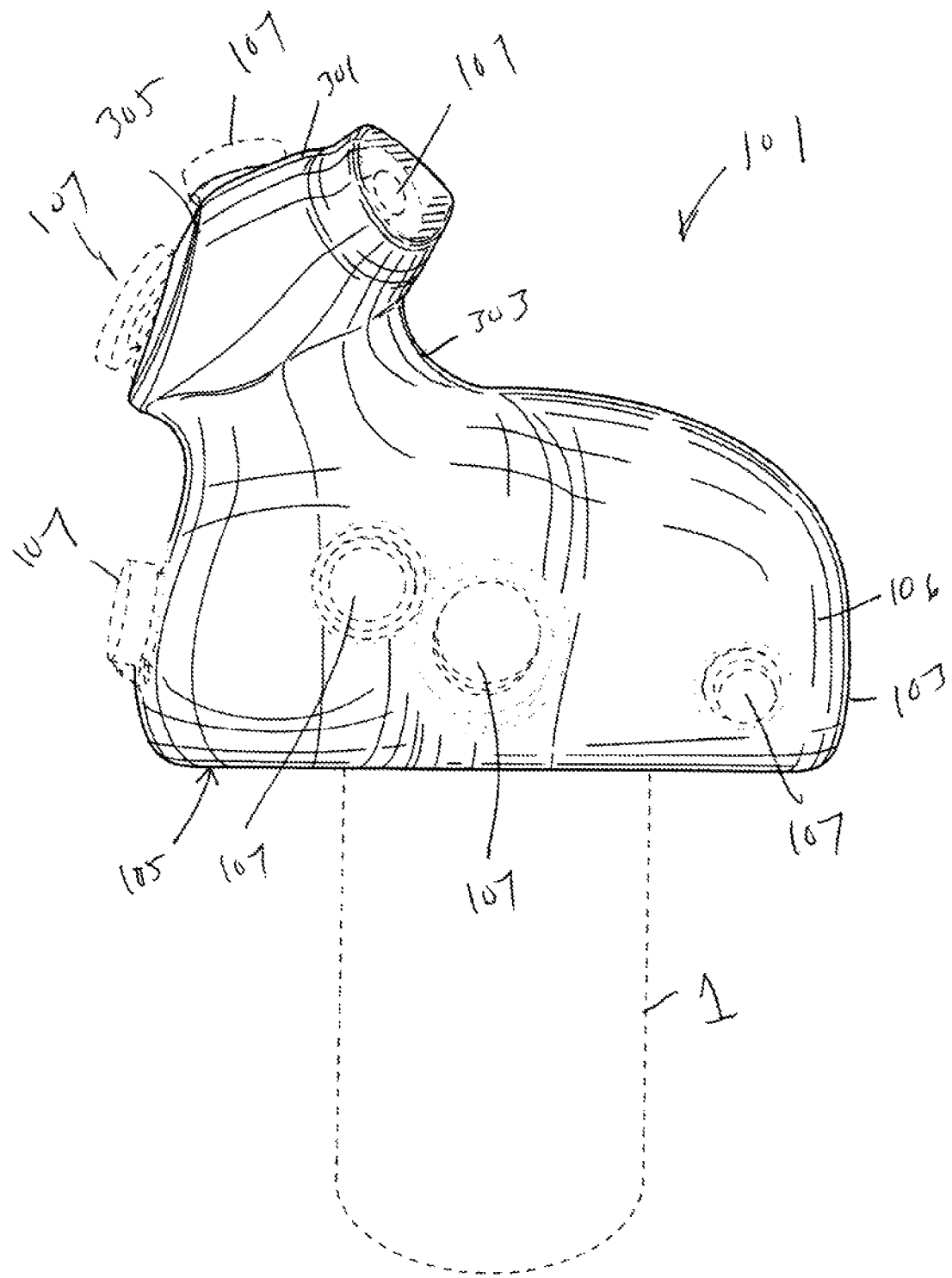
FIG. 3 provides a front view of the embodiment of FIG. 2.
Figure 4:
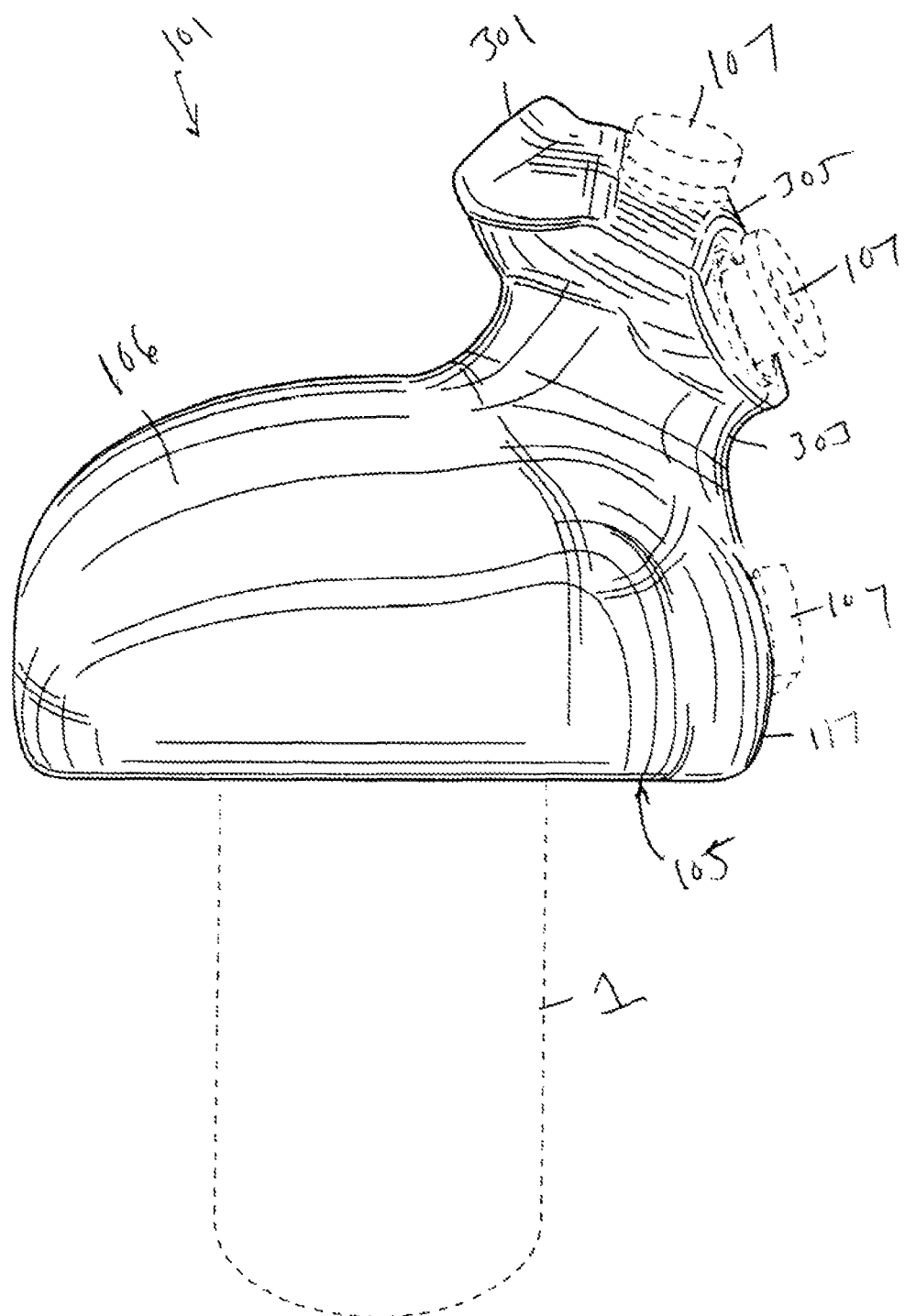
FIG. 4 provides a back view of the embodiment of FIG. 2.

As can be best seen in FIGS. 2-3, there are positions for multiple controls (107) to be positioned on the convex upper surface (106) of the main body (103) of the first embodiment generally on the front (115) and right (117) sides. These positions will generally correspond to the appropriate positions of the finger (403), (405), (407) and (409) tips and thumb (401) respectively when the palm is placed on the top (119) of the convex upper surface (106) from the backside (111). The extension portion (303) of the horn portion (301) is then generally placed at or near the web of skin (411) connecting the thumb (401) to the index finger (403). The second embodiment of the control system (1101) would generally have a near identical positioning of controls (107).

The third and fourth embodiments of the control system (2101) and (3101) will generally utilize a similar positioning of controls (107) with a number of controls (107) located on the front surfaces (2115) and (3115) for manipulation by the fingers and a selection of controls (107) located on the right side (2117) and (3117) for manipulation by the thumb. However, as the control systems (2101) and (3101) lack the distinct horn portion (117) and (1117) of the first two embodiments, the horn portion (2117), and (3117) of these later embodiments are not as clearly within the web between the thumb and fingers. Instead, the horn portion (2117) and (3117) more provide a logical rest for the web portion of the hand. Further, on the horn portions (2117) and (3117) of the later embodiments, many of the controls (107) are still generally accessible for use by the thumb.

Regardless of the embodiment, manipulation and use of the controls (107) on the various embodiments of control system (101), (1101), (2101) and (3101) will usually be similar. To illustrate hand positioning, FIGS. 9-14 show hand positions which can be used to grip the control system (101). The first embodiment of control system (101) is used in these FIGS. to illustrate exemplary hand positions across embodiments as the first and second embodiments are generally seen as a little more complicated to hold (with the third and fourth having a simpler grip arrangement).

As the collective lever is generally to the left of the pilot, the human hand depicted in FIGS. 9-14 is the left hand. One of ordinary skill in the art would recognize that if the control system (101) was to be used by the right hand, a mirror image design of FIGS. 2-8 could be used.

FIGS. 9-14 also illustrate how the thumb (401) and/or fingers (403), (405), (407), and (409) can be moved around to manipulate different controls (107) or place the fingers off of controls (107) without the generally spherical grip the hand (400) has on the control system (101) being released. The ability to manipulate the controls allows for the pilot to manipulate the controls (107) with not just their thumb (401), but also their other fingers (403), (405), (407) and (409) without releasing their grip and, thus, the control system provides for much easier manipulation of controls (107) as well as the ability to provide for more controls (107) and more controls to be manipulated close together or simultaneously that control systems such as that shown in FIG. 1.

It should also be clear that even though the pilot is grasping the control system (101) as shown in FIGS. 9-14, because of the attachment position of the control system (101) to the collective lever (1), the pilot can still manipulate the collective lever (1) of the rotorcraft without removing their hand (400) from the control system (101). Specifically, as the user has a grip on the control system and based on the position of the control system, the pilot pulling on the control system (101) will cause the collective lever (1) to move upward. Similarly, pushing on the control system (101) will cause the collective lever (1) to move downward. In the depicted embodiment, the positioning of the horn further enhances the movement as the web (411) serves to push against the extension portion (303) to provide additional transfer of force.

In addition to providing for the support portion (305) upon which to mount additional controls (107), the horn (301) also provides an additional benefit. Should the pilot be gripping the main body (103) of the control system (101) as shown in FIGS. 9-14 but suddenly need to make a large change to the collective lever (1), the horn (301) provides an additional point to grasp. The pilot, instead of needing to remove their hand from the main body (103) and go around the main body (103) to grasp the collective lever (1) directly (although they can still do that) they can release the main body (103) and wrap their hand around the horn (301). As the support portion (305) is typically much smaller than the main body (103) this allows for the user to wrap their fingers under the support portion (305) and provide more of a cylindrical grip. It should be noted that the cylindrical grip of the horn portion (301) is also more with the finger facing forward of the pilot as opposed to toward the left as is the case when the cylinder lever (1) is gripped directly.

As the horn portion (301) effectively is beyond the terminal end (15) of the collective lever (1), such a grip actually provides improved leverage to manipulate the collective lever (1) quickly over a larger distance in either direction. Further, as the pilot has a more cylindrical or power grip about the horn portion (301) this can give them the ability to more easily transfer increased force to the collective lever (1) than when the hand (400) is placed on the main body (103). Further, as more modern rotorcraft do not require manipulation of the throttle (5) with the collective lever (1), the pilot has no need to grasp the throttle (5) to adjust the collective lever (1).

The qualifier "generally," and similar qualifiers as used in the present case, would be understood by one of ordinary skill in the art to accommodate recognizable attempts to conform a device to the qualified term, which may nevertheless fall short of doing so. This is because terms such as "planar" are purely geometric constructs and no real-world component is a true "plane" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A control system for attachment to the collective lever of a rotorcraft, the control system comprising:
    a main body being generally rectangular in horizontal cross section and including:
        a base having a generally planar lower surface for attachment to an end of a collective lever;
        a horn portion extending a first side of said main body to create an overhang indirectly supported by said base and projecting horizontally away from said main body; and
        an upper surface having a generally convex form extending from said horn toward a second side of said main body, said second side being opposed to said first side, and terminating in a concave depression at said second side; and
    a plurality of controls, wherein a first control in said plurality of controls is arranged on said main body and a second control in said plurality of controls is arranged on said horn portion;
    wherein, said control system is configured to be grasped by a human hand with fingers of said human hand on said main body and the thumb of said human hand on said horn portion; and
    wherein said control system is configured for said human hand grasping said control system to move said collective lever without removing said fingers of said human hand from said main body and said thumb of said human hand from said horn portion.

2. The control system of claim 1 wherein said horn portion includes a third control in said plurality of controls.

3. The control system of claim 2 wherein when said human hand grasp said control system at least one of said fingers of said human hand is positioned on said first control and said thumb of said human hand is positionable on either said second control or said third control.

4. The control system of claim 3 wherein said thumb of said human hand may be moved from said horn portion to operate an additional control on said main body.

5. A collective lever and control system of a rotorcraft comprising:
    a collective lever having two opposing ends; and
    a control system attached to one of said two opposing ends of said collective lever, said control system comprising:
        a main body being generally rectangular in horizontal cross section and including:
            a base having a generally planar lower surface for attachment to an end of a collective lever;
            a horn portion extending a first side of said main body to create an overhang indirectly supported by said base and projecting horizontally away from said main body; and
            an upper surface having a generally convex form extending from said horn toward a second side of said main body, said second side being opposed to said first side, and terminating in a concave depression at said second side; and
        a plurality of controls, wherein a first control in said plurality of controls is arranged on said main body and a second control in said plurality of controls is arranged on said horn portion;
        wherein, said control system is configured to be grasped by a human hand with fingers of said human on said main body and the thumb of said human hand on said horn portion; and
        wherein said control system is configured for said human hand grasping said control system to move said collective lever without removing said fingers of said human hand from said main body and said thumb of said human hand from said horn portion.

6. The control system of claim 5 wherein said horn portion includes a third control in said plurality of controls.

7. The control system of claim 6 wherein when said human hand grasps said control system at least one of said fingers of said human hand is positioned on said first control and said thumb of said human hand is positionable on either said second control or said third control.

8. The control system of claim 7 wherein said thumb of said human hand may be moved from said horn portion to operate an additional control on said main body.

9. A method of operating a collective lever and control system of a rotorcraft comprising:
    providing a collective lever having two opposing ends;
    providing a control system attached to one of said two opposing ends of said collective lever, said control system comprising:
        a main body being generally rectangular in horizontal cross section and including:
            a base having a generally planar lower surface for attachment to an end of a collective lever;

a horn portion extending a first side of said main body to create an overhang indirectly supported by said base and projecting horizontally away from said main body; and an upper surface having a generally convex form extending from said horn toward a second side of said main body, said second side being opposed to said first side, and terminating in a concave depression at said second side; and a plurality of controls, wherein a first control in said plurality is arranged on said main body and a second control in said plurality is arranged on said horn portion;

grasping said control system so that fingers are on said main body and a thumb on said horn portion;

pulling said collective lever without removing said fingers from said main body;

moving said thumb from said horn portion to said main body; and operating said plurality of controls with at least one of said fingers and said thumb without removing said fingers from said main body.

10. The method of claim 9 wherein at least one of said fingers operates said first control and said thumb operates said second control.

11. The method of claim 10 wherein moving said thumb from said horn portion to said main body includes said thumb operating an additional control on said main body.

12. The method of claim 9 wherein said horn portion includes a third control in said plurality of controls.

13. The method of claim 12 wherein when said human hand grasps said control system at least one of said fingers of said human hand is positioned on said first control and said thumb of said human hand is positionable on either said second control or said third control.

14. The method of claim 13 wherein said thumb of said human hand may be moved from said horn portion to operate an additional control on said main body.

* * * * *